US012535203B2

(12) United States Patent
Samson

(10) Patent No.: US 12,535,203 B2
(45) Date of Patent: Jan. 27, 2026

(54) LED LIGHT STRIP ASSEMBLY AND CONNECTOR FOR SAME

(71) Applicant: IP LLC A SERIES OF MODALIGHT LLC, Las Vegas, NV (US)

(72) Inventor: Mark Samson, Las Vegas, NV (US)

(73) Assignee: IP LLC A SERIES OF MODA LIGHT LLC, Las Vegas, NV (US)

(*) Notice: Subject to any disclaimer, the term of this patent is extended or adjusted under 35 U.S.C. 154(b) by 0 days.

(21) Appl. No.: 18/890,583

(22) Filed: Sep. 19, 2024

(65) Prior Publication Data

US 2025/0230925 A1 Jul. 17, 2025

Related U.S. Application Data

(60) Provisional application No. 63/619,842, filed on Jan. 11, 2024.

(51) Int. Cl.
*F21V 23/06* (2006.01)
*F21S 4/10* (2016.01)
(Continued)

(52) U.S. Cl.
CPC ................ *F21V 23/06* (2013.01); *F21S 4/10* (2016.01); *F21V 17/164* (2013.01); *F21Y 2113/00* (2013.01); *F21Y 2115/10* (2016.08)

(58) Field of Classification Search
CPC .................................. F21S 4/10; H01R 12/78
See application file for complete search history.

(56) References Cited

U.S. PATENT DOCUMENTS 9,239,136 B1 * 1/2016 Petersen ................. F21V 23/06
2005/0260874 A1 * 11/2005 Murakami ........... H01R 13/501
439/142
(Continued)

FOREIGN PATENT DOCUMENTS

CN 216591196 U * 5/2022
CN 216591197 U * 5/2022 ................ F21S 4/20
(Continued)

OTHER PUBLICATIONS

Amazon, QIJIE RGB LED Connector for 10 mm Non-Waterproof/ Silicon Waterproof Strip Light, https://www.amazon.com/QIJIE-Connector-NON-WATERPROOF-Terminal-Include/dp/B01N9QXW04?ref _=fplfs&smid=AU735NF6R0886&source=ps, accessed Aug. 2, 2024; 10 pages.
(Continued)

*Primary Examiner* — Zheng Song
(74) *Attorney, Agent, or Firm* — Snell & Wilmer LLP

(57) ABSTRACT

A connector is for an LED light strip assembly. The assembly includes a first LED light strip and a second LED light strip. The connector includes at least one base member, a first clamp member and a second clamp member each associated with the base member, and a number of electrical contacts coupled to the base member, and each configured to be electrically connected to each of the first and second LED light strips. The first and second clamp members are configured to pivot about the first side of any of the base members between open and closed positions, such that when the first and second clamp members are in the closed position, the first and second clamp members each face a top of the base member and press the electrical contacts into a tight-fitting engagement with a corresponding electrical contact of the first and second LED light strips.

17 Claims, 16 Drawing Sheets

(51) Int. Cl.

| | |
|---|---|
| ***F21V 17/16*** | (2006.01) |
| *F21Y 113/00* | (2016.01) |
| *F21Y 115/10* | (2016.01) |

(56) References Cited

U.S. PATENT DOCUMENTS

| | | | | |
|---|---|---|---|---|
| 2012/0075863 | A1* | 3/2012 | Chen | F21V 21/002 362/249.18 |
| 2015/0241035 | A1* | 8/2015 | Dankelmann | F21V 21/005 439/725 |
| 2022/0349564 | A1* | 11/2022 | Flynn | H01R 13/00 |
| 2024/0288151 | A1* | 8/2024 | Xiao | F21V 21/002 |

FOREIGN PATENT DOCUMENTS

| | | | | |
|---|---|---|---|---|
| DE | 10065972 | A1 * | 7/2002 | H01R 12/616 |
| EP | 2449636 | B1 * | 3/2016 | F21S 4/22 |

OTHER PUBLICATIONS

Lowes, Armacost Lighting 4-Pack Cabinet Lighting Jumper Cord, https://www.lowes.com/pd/Armacost-Lighting-4-Pack-Cabinet-Lighting-Jumper-Cord/5013490693?user=shopping&feed=yes&srs, printed Aug. 2, 2024; 4 pages.

* cited by examiner

LED LIGHT STRIP ASSEMBLY AND CONNECTOR FOR SAME

CROSS REFERENCE TO RELATED APPLICATION

This application claims priority to and claims the benefit of U.S. Provisional Application Ser. No. 63/619,842, filed Jan. 11, 2024, the contents of which are incorporated herein by reference in their entirety.

FIELD OF THE INVENTION

The present invention is directed to connectors for LED light strip assemblies. The present invention is also directed to LED light strip assemblies.

BACKGROUND OF THE INVENTION

A variety of light strips are known. For example, LED light strips commonly include a generally planar substrate that supports a plurality of conductors (such as elongate electrically conductive material), and light emitting diodes (LEDs). The LEDs may be spacedly located along the substrate and be electrically connected to the conductors. These light strips may be provided in a plurality of lengths and may include LEDs which emit one or more colors or light, including different colors in different patterns, such as controlled by a LED light strip controller.

In some instances, it is desirable to connect one or more of these light strips. For example, a light strip might be run along one side of a room at the ceiling and then along an adjacent side of the ceiling in the same room, where the second side is perpendicular to the first side. If a single light strip is used, this requires twisting or bending the light strip at the corner, which creates an undesirable appearance and places stresses on the light strip.

It is with respect to these and other drawbacks in the art that the present disclosure is concerned.

SUMMARY OF THE INVENTION

One aspect of the invention is directed to a connector for a light strip assembly, such as an LED light strip assembly. The connector may be configured to join a supply cable to a light strip, such as in a linear arrangement, to join two light strips in a linear arrangement, to join two light strips at an angle to one another, such as perpendicular thereto, or to join 3 or more light strips together, such as four light strips in a "+" arrangement.

The connectors may include at least one base member, one or more clamp members which can be moved between open and closed positions relative to the base member, a number of electrical contacts mechanically coupled to the base member and each configured to be electrically connected to the LED light strip or a supply cable. The connector may also include cover elements, such as for joining two or more base members at orientations relative to one another.

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

As employed herein, the term "coupled" shall mean connected together either directly or via one or more intermediate parts or components.

Figure 1:
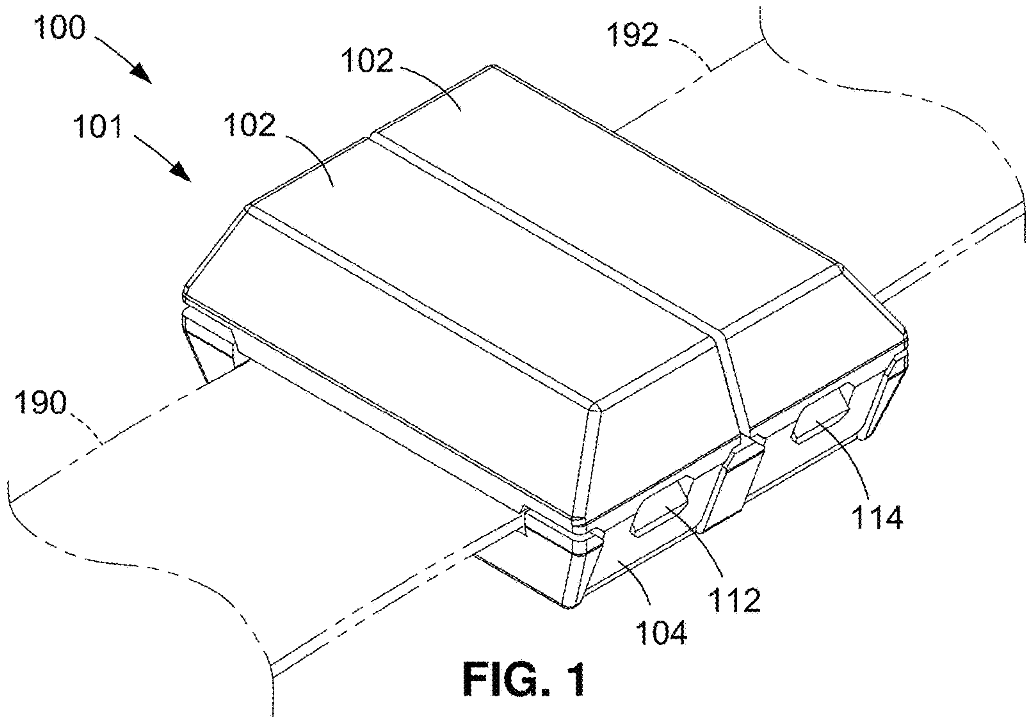
FIG. 1 is an isometric view of a light strip assembly and connector for the same, shown with two LED light strips in phantom line drawing, in accordance with one non-limiting embodiment of the disclosed concept.

FIG. 1 illustrates a light emitting diode (LED) light strip assembly 100, which includes a connector 101 for at least one LED light strip 190 and 192, e.g., wherein the LED light strips 190 and 192 may be employed in, for example, a bar or a night club or other location to provide an aesthetically pleasing illumination to patrons. FIGS. 2-3 and 5-9 illustrate various views of the connector 101. This connector 101 is preferably configured to connect the two light strips 190, 192 in a linear or end-to-end configuration. Most preferably, the connector 101 electrically connects the two light strips 190, 192, e.g. so that power (including ground) and, in some embodiments, control signals, which are provided to one light strip 190, are connected or extended to the second light strip 192.

The example connector 101 optionally includes a generally quadrilateral-shaped (such as square or rectangular) base member 104 and a number (e.g., 2) of clamp members 102 each associated with (e.g., movably and/or pivotably coupled to) the base member 104 and configured to move between open and closed positions with respect to the base member 104. In such a configuration, the connector 101 may generally have a top (generally defined by the clamp members 102 when in their closed position), an opposing bottom (generally defined by the base member 104), first and second ends and first and second sides. In the configuration which is illustrated, the connector 101 is configured to accept one light strip 190 at a first end and the other light strip 192 at the other end.

In one example, the base member 104 and the clamp members 102 are made of monomeric and/or polymeric materials, e.g., injection molded pieces. However, it will be appreciated that the base member 104 and the clamp member 102 may be made of suitable alternative materials, without departing from the scope of the disclosed concept. Additionally, although the clamp members 102 are shown as being a single component together with the base member 104, it will be appreciated that a suitable alternative clamp member (not shown) may be an entirely separate component, e.g., a snap-on clamp member and/or a clamp member configured to be coupled to a base member via a press-fit mechanism.

In an embodiment where the clamp members 102 are pivotally connected to the base member 104, one end of each clamp member 102 is pivotally joined to the base member 104 (such as via a hinge connection, such as which might comprise a flexible portion of the plastic material which is used to form/old the body and clamp member), and a second or free end may be selectively connected to the base member 104, such as via a connector. In one embodiment, referring to FIG. 2, the connectors may comprise mating latches and tabs. For example, the clamp members 102 may each have a corresponding latch member 106 and 108. Moreover, the base member 104, as shown, has a body 105 having corresponding tabs (e.g., protrusions extending outwardly from the body 105) 112 and 114, such as located at a side thereof. In one example, the latch members 106 and 108 of the clamp members 102 are configured to engage and couple to the tabs 112 and 114 of the base member 104 in order for the clamp members 102 to couple to the base member 104 in a closed position. It will be appreciated that opening of the clamp members 102 may be performed via flexing of one of the latch members 106 and 108 with respect to tabs 112, 114 of the base member 104. Of course, the configuration of the connectors might be reversed (e.g. where the tabs are located on the clamping members and the latches are located on the base member).

Figure 3:
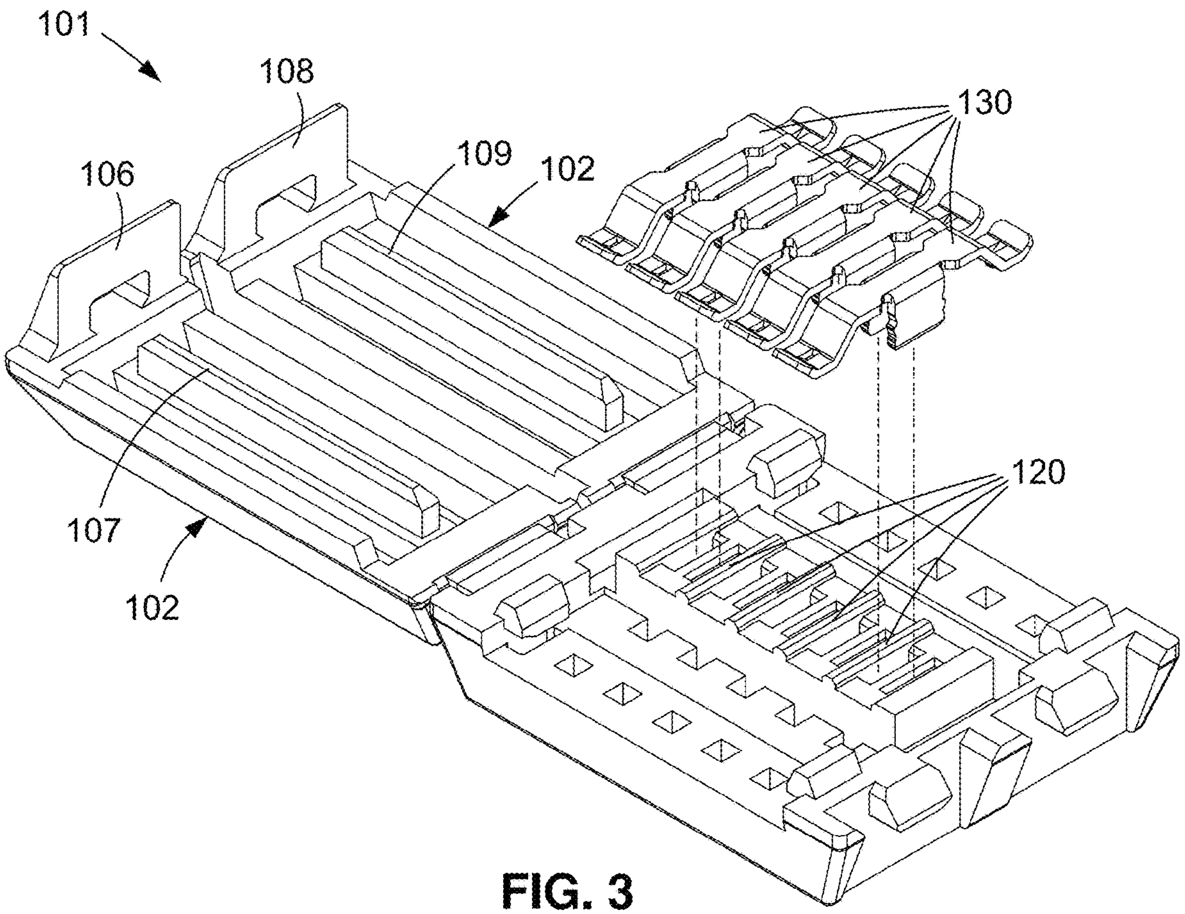
FIG. 3 is an exploded isometric view of the connector of FIG. 2.
Figure 4:
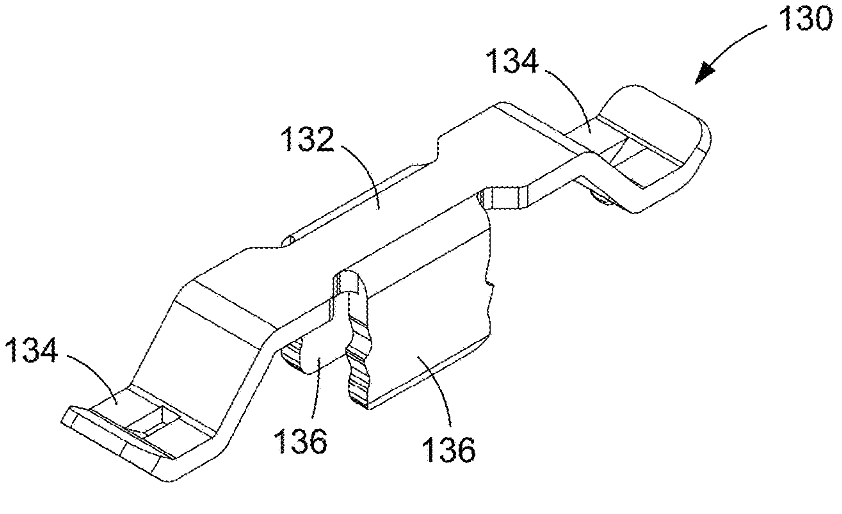
FIG. 4 is an isometric view of an electrical contact for the connector of FIG. 3.
Figure 5:
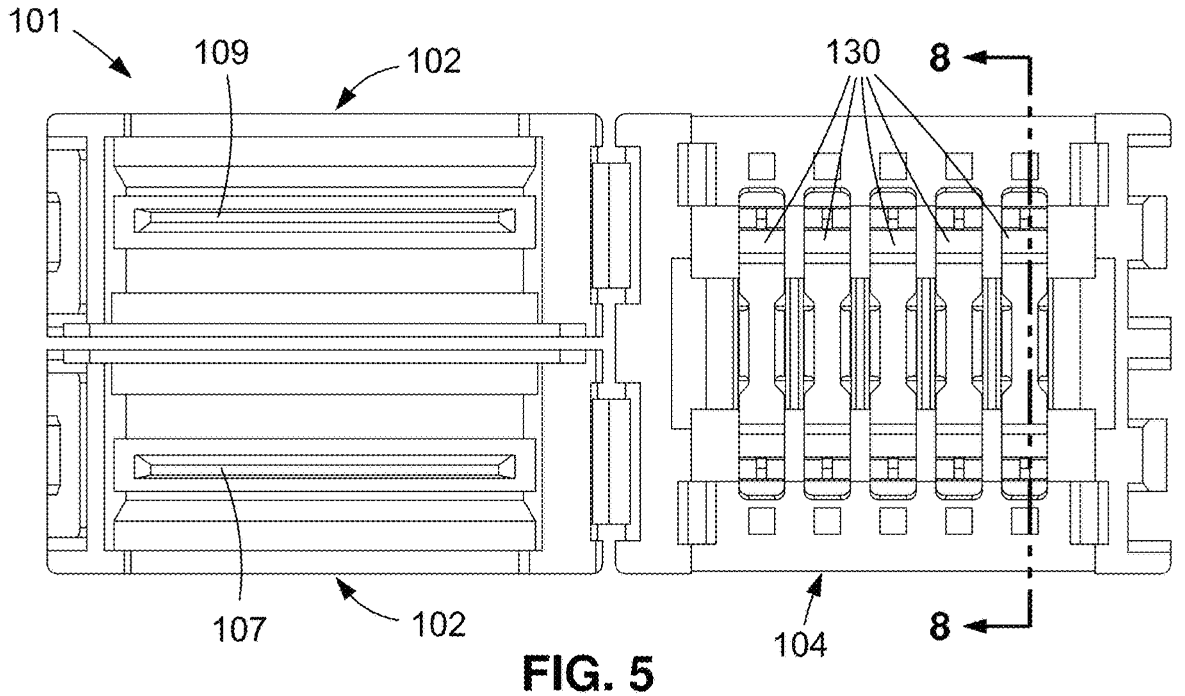
FIGS. 5-9 are top plan, side, bottom, side section with clamp members open, and side section with clamp members closed views, respectively, of the connector of FIG. 4.
Figure 6:
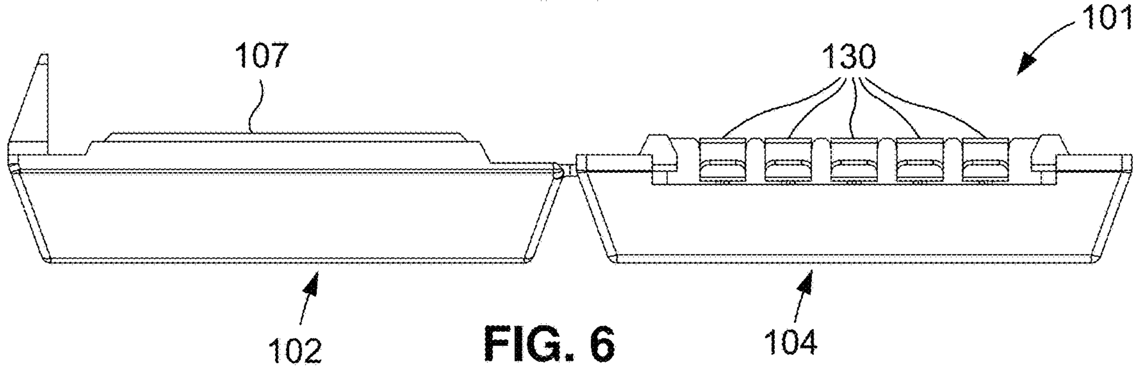

Referring to FIG. 3, in one example the connector 101 further includes a plurality (e.g., 5) of electrical contacts 130 coupled to the base member 104. FIG. 4 shows an isometric view of one of the electrical contacts 130, which may be configured the same as the other four electrical contacts 130. In one example, the electrical contact 130 includes a planar middle portion 132, a pair of downwardly extending contact portions 134 extending downwardly and away from the middle portion 132, and a pair of coupling portions 136 extending from and being located perpendicular to the middle portion 132, being located on opposing sides of the middle portion 132, and configured to couple the electrical contact 130 to the base member 104. Additionally, the electrical contacts 130 are preferably all made of electrically conductive materials, such as metallic materials (preferably copper), without departing from the scope of the disclosed concept.

Referring again to FIG. 3, as shown, the base member 104 may define a plurality of ribs 120 each configured to connect the electrical contacts 130 thereto, such as in a snap-fit connector. Pairs of the ribs 120 may each define a channel for accepting one of the electrical contacts 130. In other words, during assembly an operator and/or machine may press the electrical contacts past or between the ribs 120, which would flex outwardly and then back inwardly in order to retain the electrical contacts 130 on the base member 104. Moreover, with the electrical contacts 130 coupled to the base member 104 via the ribs 120, and the clamp members 102 provided in a closed position, the electrical contacts 130 are advantageously insulated by the base and clamp members 102 and 104, such that a person who contacts, whether intentionally or not, the connector 101 in a closed position would not engage with the electrical contacts 130.

Figure 8:
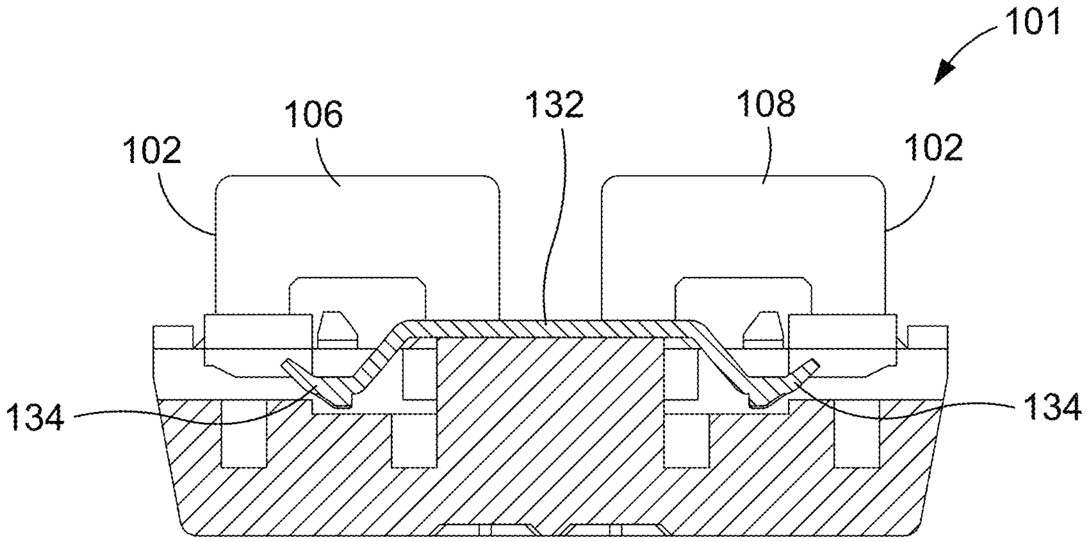
Figure 9:
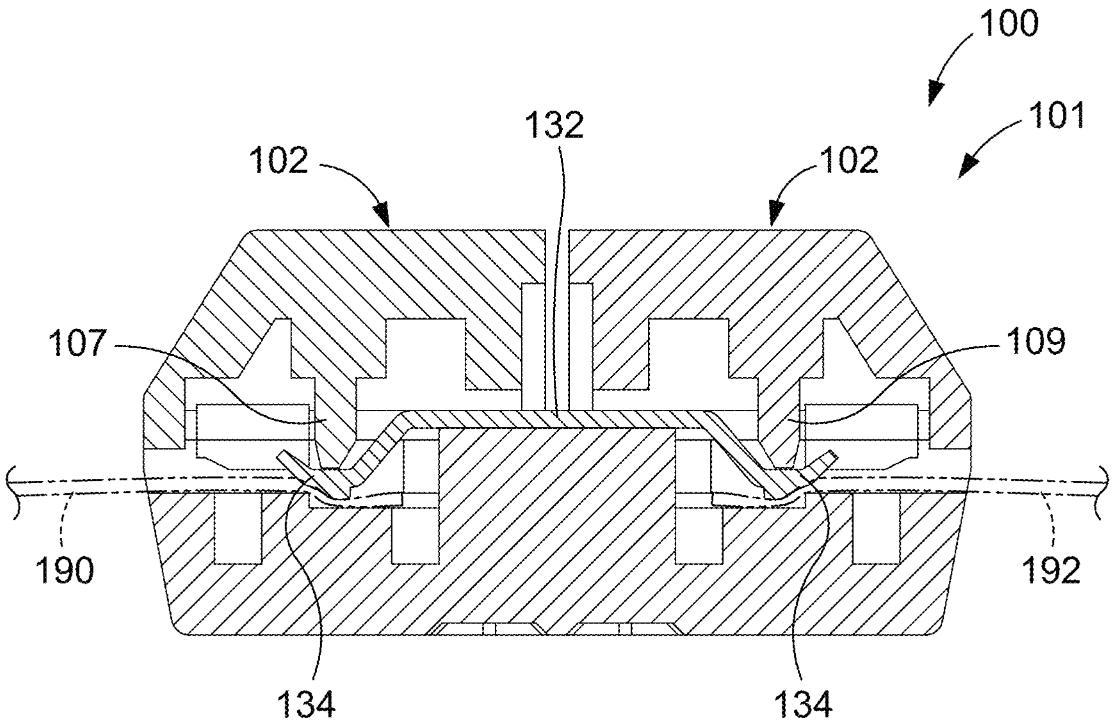
Figure 10:
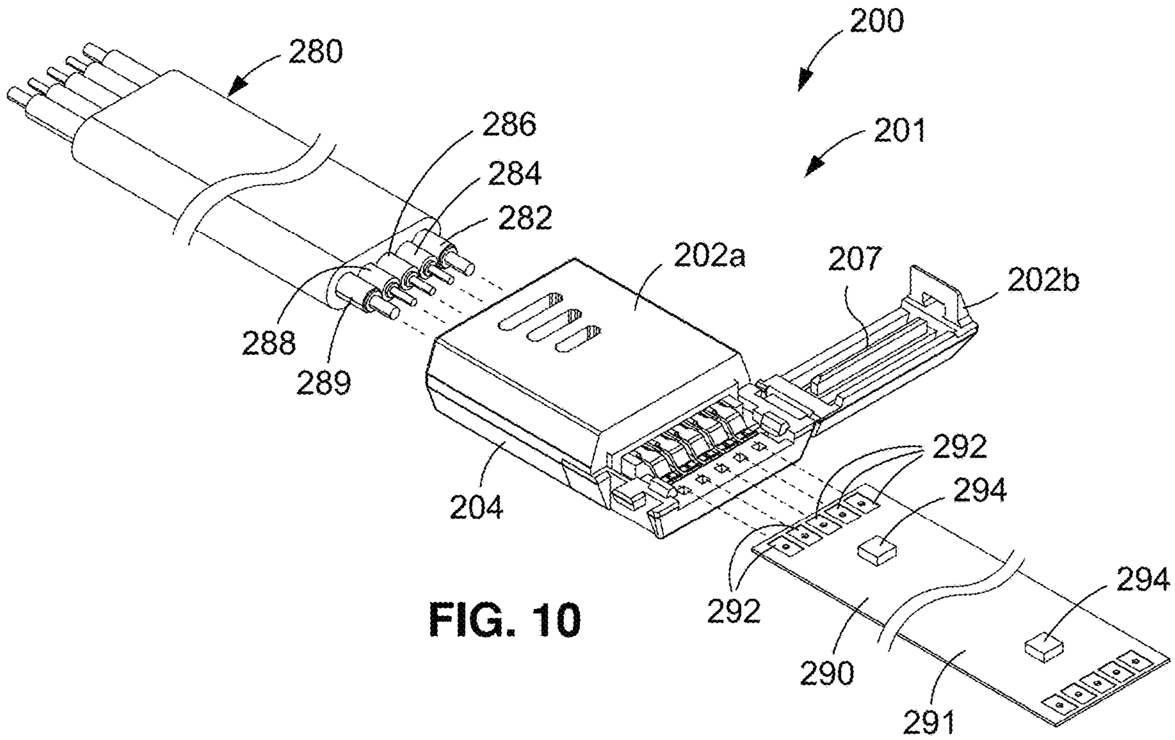
FIGS. 10 and 11 are exploded isometric and isometric views, respectively, of a portion of another light strip assembly and connector for the same, in accordance with another non-limiting embodiment of the disclosed concept.
Figure 11:
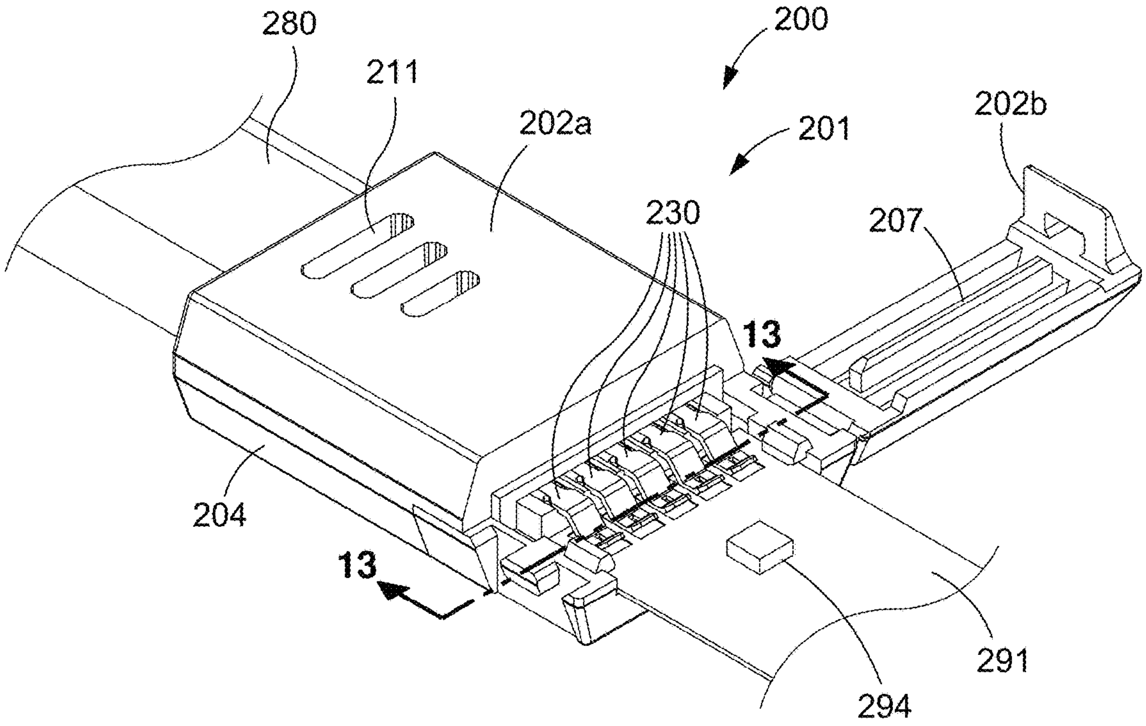

FIGS. 8 and 9 show section views of the connector 101 with the clamp members 102 in an open position (FIG. 8) and a closed position (FIG. 9). In operation, the clamp members 102 are configured to maintain an engagement between the electrical contact 130 and the LED light strips 190 and 192. In particular, and as shown in FIG. 9, in one embodiment, the clamp members 102 each define a body and one or more downwardly extending protrusions, such as longitudinal ribs 107 and 109, extending outwardly from the body. When the clamp members 102 are in the closed position, the ribs 107 and 109 press down on a top surface of the contact portions 134 of the electrical contact 130, thereby pressing the electrical contacts 130 into engagement with a corresponding electrical contact (not shown in FIG. 9, but see for reference electrical contacts 292 in FIG. 10) of the LED light strips 190 and 192. As illustrated in FIG. 1, when the clamp members 102 are closed, they are each preferably coupled to the base member 104 via a tongue and groove mechanism, and cooperate with the base member 104 to define a slot at each end of the connector 101 which allows the LED light strips 190 and 192 to extend into the connector 101.

In one embodiment, the connector 101 is configured to permit a “5 way” connection, e.g. to connect 5 lead LED light strips to one another (e.g. where the LED light strips generally have 5 spaced-part contacts at a top side of an end thereof), and as such have 5 electrical contacts 130 which are configured to mate with 5 corresponding contacts on the associated LED light strips 190 and 192 (which connections may, for example, connect a power lead of the light strips, a ground lead of the light strips, a control lead of the light strips, etc.). Of course, the connector might be used to join LED light strips of other configurations, such as having a fewer number of contacts. Further, the locations of the electrical contacts 130 of the connector 101 are desired to correspond to the contacts of the LED light strips, such as the locations might vary if the connector 101 is used to join or connect light strips having other configurations of contacts or leads.

Figure 7:
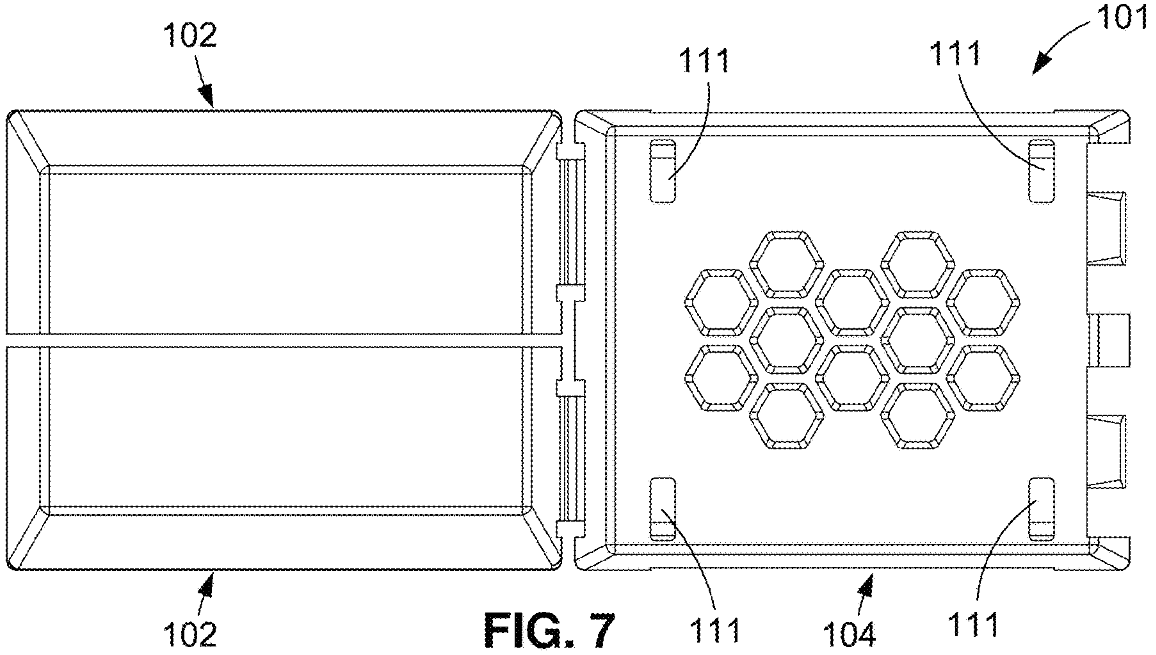

In one embodiment, as illustrated in FIG. 7, the base 104 may define one or more openings 111 therein, such as to permit viewing into the connector 101 when the clamping members 102 are closed. The openings 111 may be located so that when an LED light strip is properly connected to the connector 101, it is visible through the opening 111, thus permitting visual confirmation of the connection.

Figure 2:
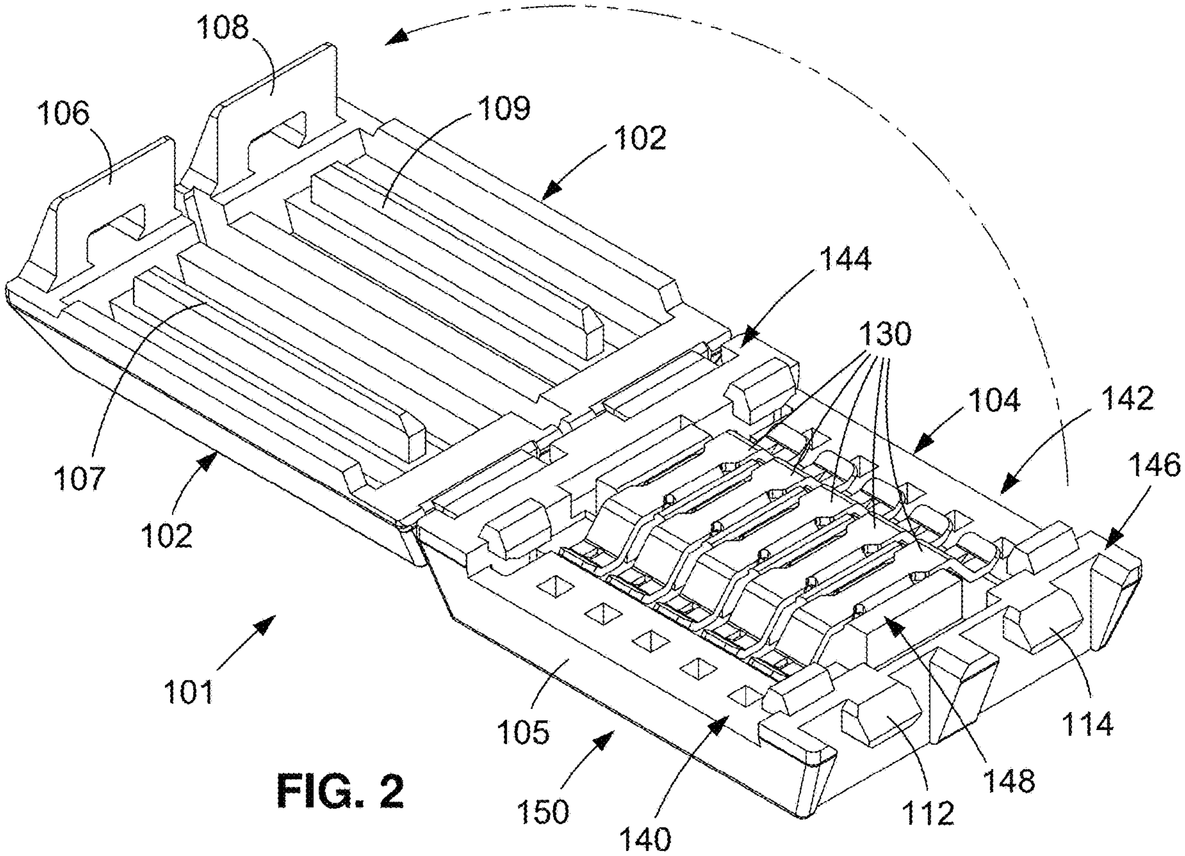
FIG. 2 is an isometric view of the connector of FIG. 1, shown with clamp members in an open position.

Referring to FIG. 2, the base 104 can also be understood as including a first end 140, a second end 142 located opposite the first end 140, a first side 144, a second side 146 located opposite the first side 144, a top 148 spanning from the first end 140 to the second end 142 and from the first side 144 to the second side 146, and a bottom 150 located opposite the top 148. The first and second ends 140 and 142 may be configured to accept the first and second LED light strips 190 and 192 (FIG. 1) in order to electrically connect the first LED light strip 190 to the second LED light strip 192. Each of the first and second sides 144 and 146 extends from the first end 140 to the second end 142. Additionally, each of the clamp members 102 are configured to pivot about the first side 144 such that when the clamp members 102 are in the closed position, the clamp members 102 each face the top 148 and press each of the electrical contacts 130 into a tight-fitting engagement with a corresponding electrical contact of the first and second LED light strips 190 and 192.

FIGS. 10-17 show different views of another LED light strip assembly 200, which includes a connector 201, a supply cable 280, and an LED light strip 290, in accordance with another non-limiting embodiment of the disclosed concept. The connector 201 is configured similar to the connector 101 (FIGS. 1-9), and like numbers represent like features. However, unlike the connector 101, which is preferably configured to connect two LED light strips 190 and 192 together, this connector 201 is preferably configured to electrically connect the supply cable 280 to the one LED light strip 290. In one example, the supply cable 280 may be electrically connected to a controller (not shown), such as for providing power, control signals and the like to one or more LED light strips.

In one embodiment, the cable 280 may have a plurality of leads, such as generally cylindrical wire leads (such as one or more of a power lead 282 and a plurality of negative leads 284, 286, 288, and 289, which may be used to provide voltage and current control and/or data control, to the LEDs), where the connector 201 is configured to couple the leads 282 and 284 and 286 and 288 and 289 to the LED light strip 290.

More specifically, the electrical contacts 230 (FIG. 11) of the connector 201 electrically connect the leads 282 and 284 and 286 and 288 and 289 (FIG. 10) to corresponding electrical contacts 292 of the LED light strip 290. In this manner, LEDs 294 located along a body portion 291 of the LED light strip 290 are configured to be selectively illuminated.

Once again, the connector 201 may comprise a base member 204 and a plurality of clamp members 202*a* and 202*b* associated with the base member 204. The connector 201 may be configured to accept the cable 280 at one end and the LED light strip 290 at the other end. In one embodiment, a first clamp member 202*a* may be configured as a cover, such as to snap or press fit onto the top of the base 204, and cooperates therewith to define a slot at one end of the connector 201 through which the cable 280 may be extended. The second clamp member 202*b* may, like with connector 101 described above, be pivotally connected to the base member 204 so that it can selectively be opened and closed.

Figure 12:
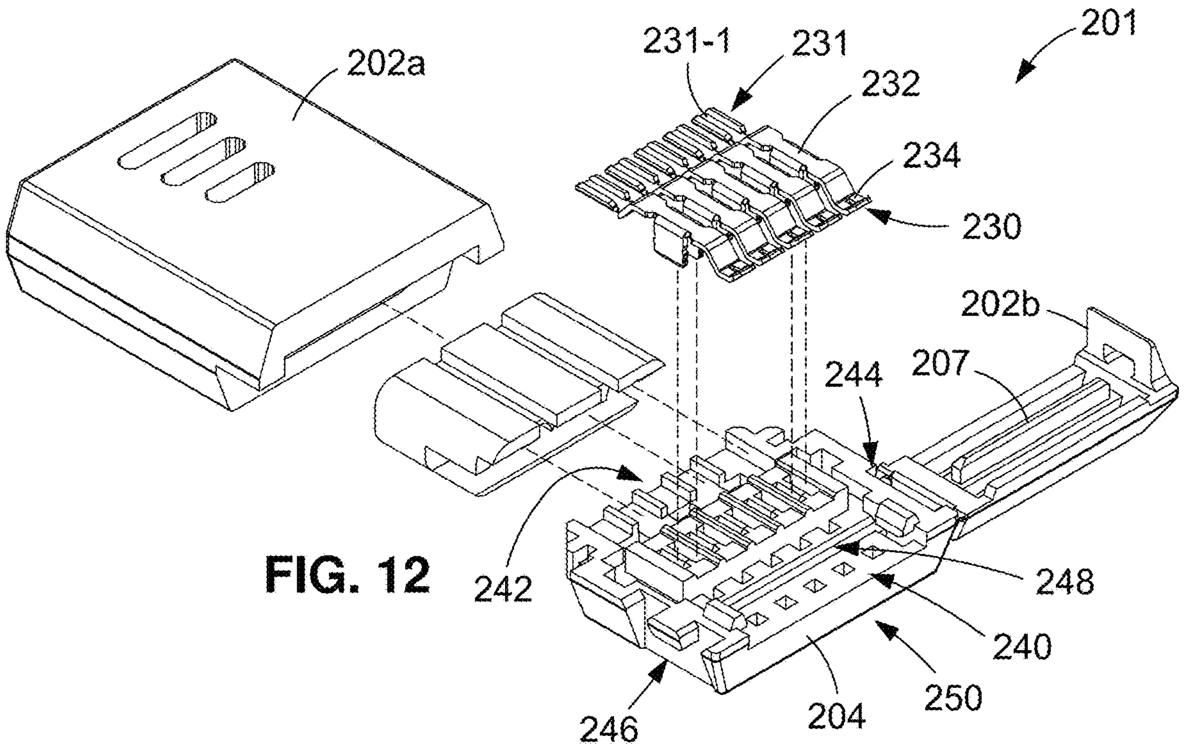
FIG. 12 is an exploded isometric view of the connector of FIGS. 10 and 11.
Figure 13:
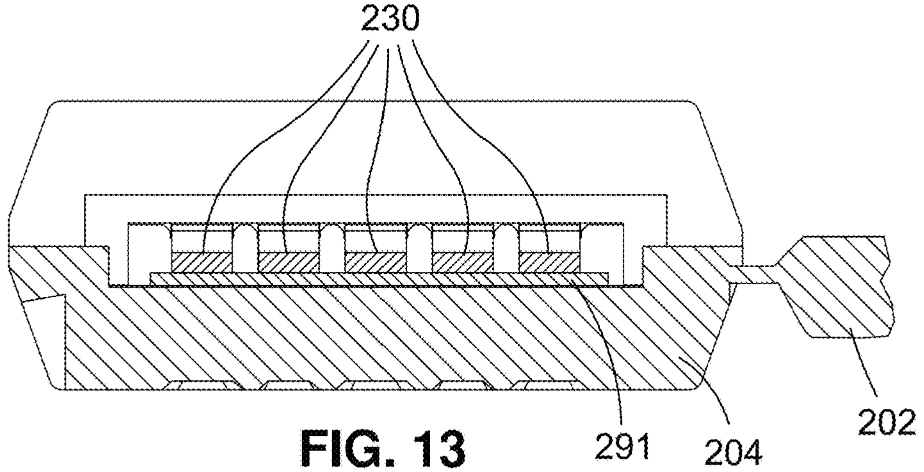
FIGS. 13 and 14 are section views of the connector of FIG. 12, shown with a clamp member in open and closed positions, respectively, with respect to a base member.
Figure 14:
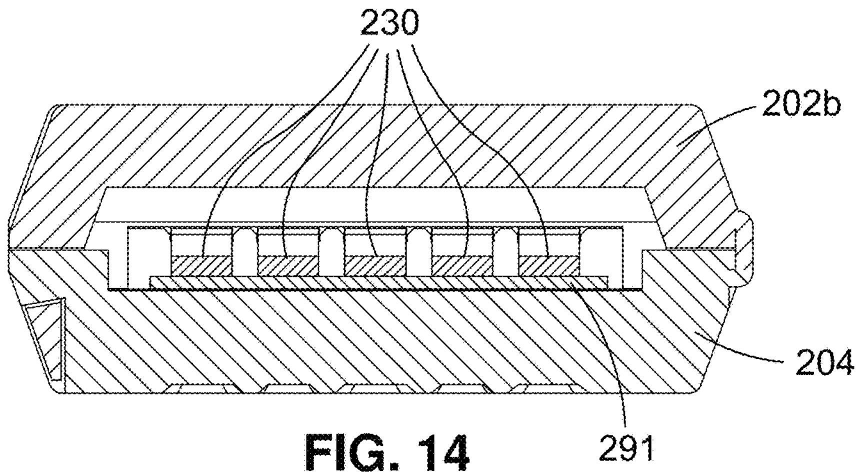
Figure 15:
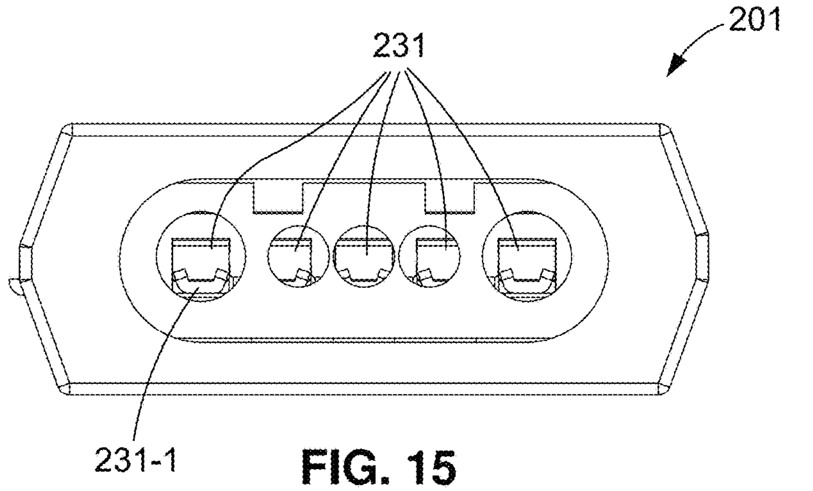
FIGS. 15-17 are left side, right side, and section views, respectively, of the connector of FIG. 12.
Figure 16:
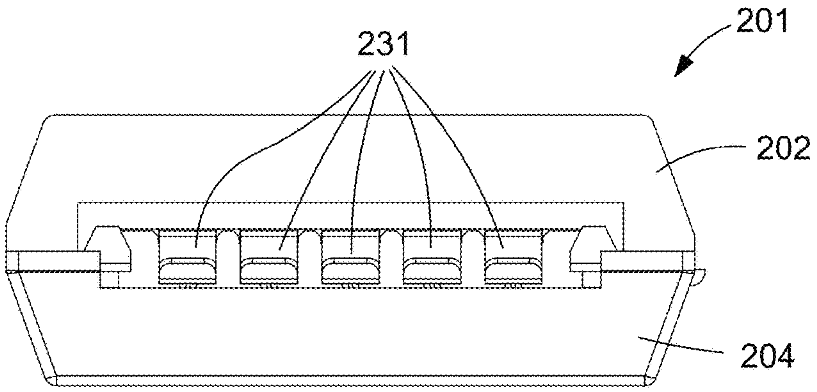

In one configuration, and referring to FIG. 12, the electrical contacts 230 optionally each comprise a middle portion 232, a first downwardly extending contact portion 231 extending from the middle portion 232, and a second downwardly extending contact portion 234 extending from the middle portion 232 away from the first portion 231. Additionally, as shown in FIG. 12, each of the first portions 231 (only a first portion 231 of one of the electrical contacts 230 is labeled, but it will be appreciated that the other four electrical contacts 230 are configured the same) has a corresponding trough 231-1 (e.g., a optionally semi-circular shaped trough portion) configured to receive a corresponding one of the leads 282 and 284 and 286 and 288 and 289 such that the leads 282 and 284 and 286 and 288 and 289 have at least a circular portion thereof engaged by the troughs 231-1 (e.g., the engagement may be a smooth engagement wherein, for example, about 30 percent of an arc of a cylindrical-shaped lead is continuously engaged by a trough 231-1). See FIG. 17, for example, which shows one of the leads 282 engaged with one of the troughs 231-1. In this manner and as a result, the supply cable 280 configured to be electrically connected to the LED light strip 290.

Figure 17:
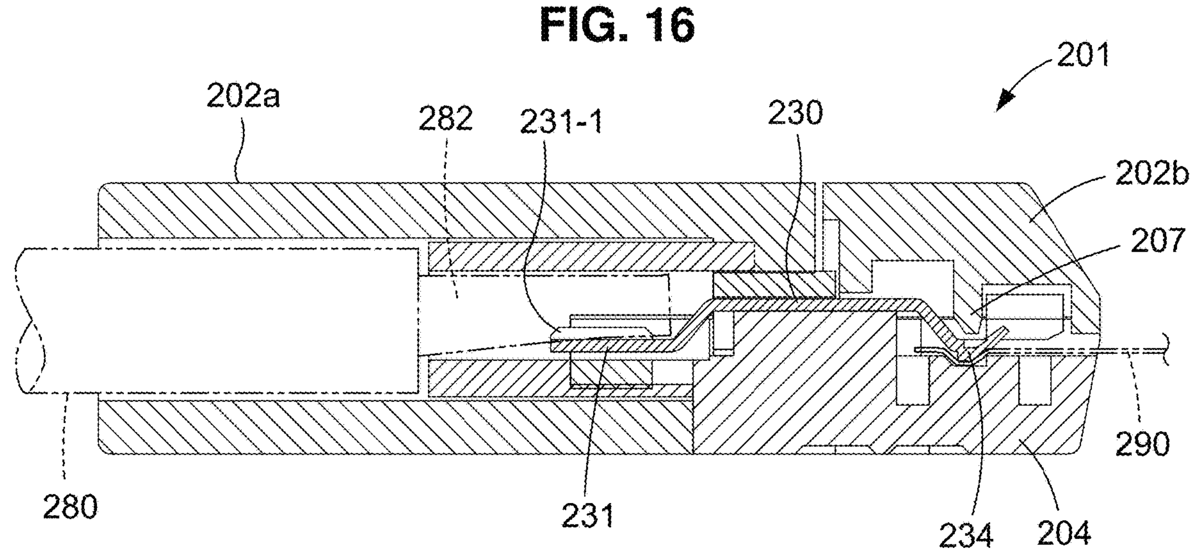

Additionally, and continuing to refer to FIG. 17, the second portion 234 of the electrical contact 230 is configured to engage and maintain engagement with the electrical contact 292 of the LED light strip 290 in the exact same manner as the connector 101, discussed above (e.g., via the clamp member 202*b* pivoting closed, with respect to the base member 204, and pressing the second portion 234 into tight fitting engagement with the electrical contact 292). That is, the longitudinal rib 207 of the clamp member 202*b* is configured to, in a closed position, engage a top portion of the second portion 234 of the electrical contact 230, and press the second portion 234 into engagement with the electrical contact 292 (FIG. 10) of the LED light strip 290, thereby providing an electrical connection between the lead 282 and the LED light strip 290.

Once again, the connector 201 may include one or more openings 211. Such openings 211 might be provided in the base 204, or alternatively or additionally, in the cover 202*a*, to once again allow visual confirmation of the connection of the cable 280 and/or LED light strip 290 to the connector 201. In one example, the cover 202*a* is coupled to the base member 204 via a snap-fit mechanism. The cover 202*a* may also define a slot at an end thereof for receiving the supply cable 280 therethrough.

Referring again to FIG. 12, the base member 204 can generally be stated as including a first end 240, a second end 242 located opposite the first end 240, a first side 244, a second side 246 located opposite the first side 244, a top 248 spanning from the first end 240 to the second end 242 and from the first side 244 to the second side 246, and a bottom 250 located opposite the top 248, and spanning from the first end 240 to the second end 242, and from the first side 244 to the second side 246. The first end 240 is configured to accept the LED light strip 290 (FIG. 10) in order to electrically connect the LED light strip 290 to the supply cable 280. Each of the first and second sides 244 and 246 extends from the first end 240 to the second end 242. Moreover, the clamp member 202*b* may be configured to pivot about the first side 244 between open and closed positions, with respect to the base member 204, such that when the clamp member 202*b* is in the closed position, the clamp member 202*b* faces the top 248 and presses each of the electrical contacts 230 into a tight-fitting engagement with a corresponding electrical contact of the LED light strip 290.

FIGS. 18-24 are different views of a third connector 301 for a third LED light strip assembly 300, configured similar to the connectors 101 and 201, discussed above, and like numbers represent like features. More specifically, the connector 301 includes base members 304*a* and 304*b* configured similar to the base members 104 and 204, e.g., including first and second sides, first and second ends, top, bottom, etc. However, for ease of illustration and economy of disclosure, the sides, ends, top and bottom of the base members 304*a* and 304*b* are not labeled. Moreover, unlike the connectors 101 and 201 which are configured to connect a cable to an LED light strip or two LED light strips in a generally linear arrangement, this connector 301 is preferably configured to join elements in a generally perpendicular orientation. One such use might be at a corner of a room, e.g., along a ceiling, such as to join a first LED light strip 390 of the assembly 300, which may extend along the ceiling with a second LED light strip 392 of the assembly 300, which may extend perpendicularly along a wall (e.g., from the ceiling toward the ground) or along another portion of the ceiling which is perpendicular to the first portion.

In one embodiment, the connector 301 includes a pair of base members 304*a* and 304*b* which are coupled together, and a clamp member 302 corresponding to each base member 304*a* and 304*b*. Once again, in a preferred embodiment, the clamp members 302 are associated with (e.g., pivotably coupled to) the base members 304*a* and 304*b*.

Figure 22:
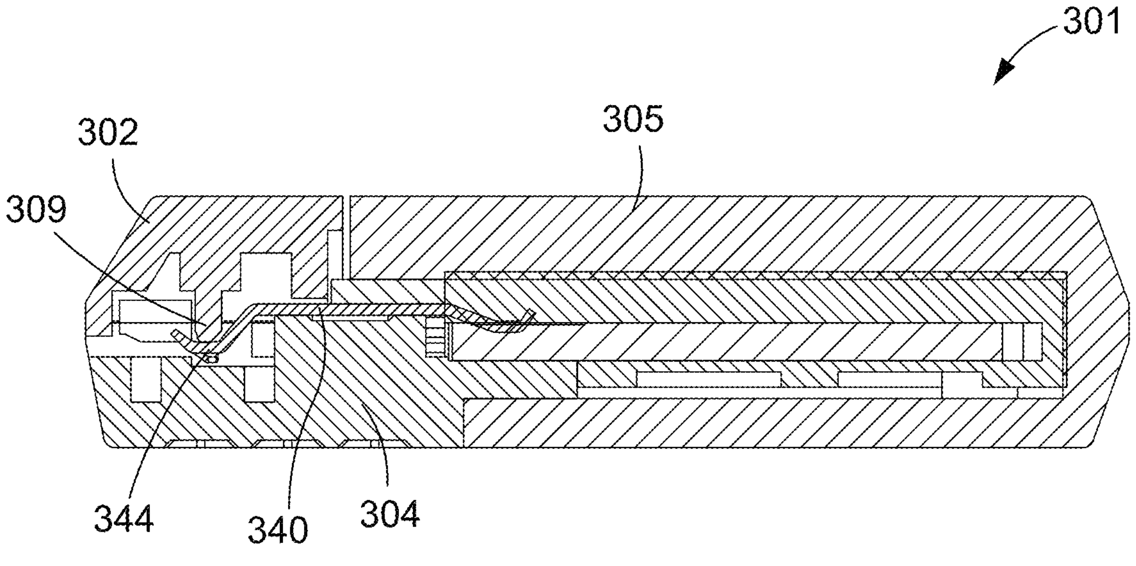
Figure 23:
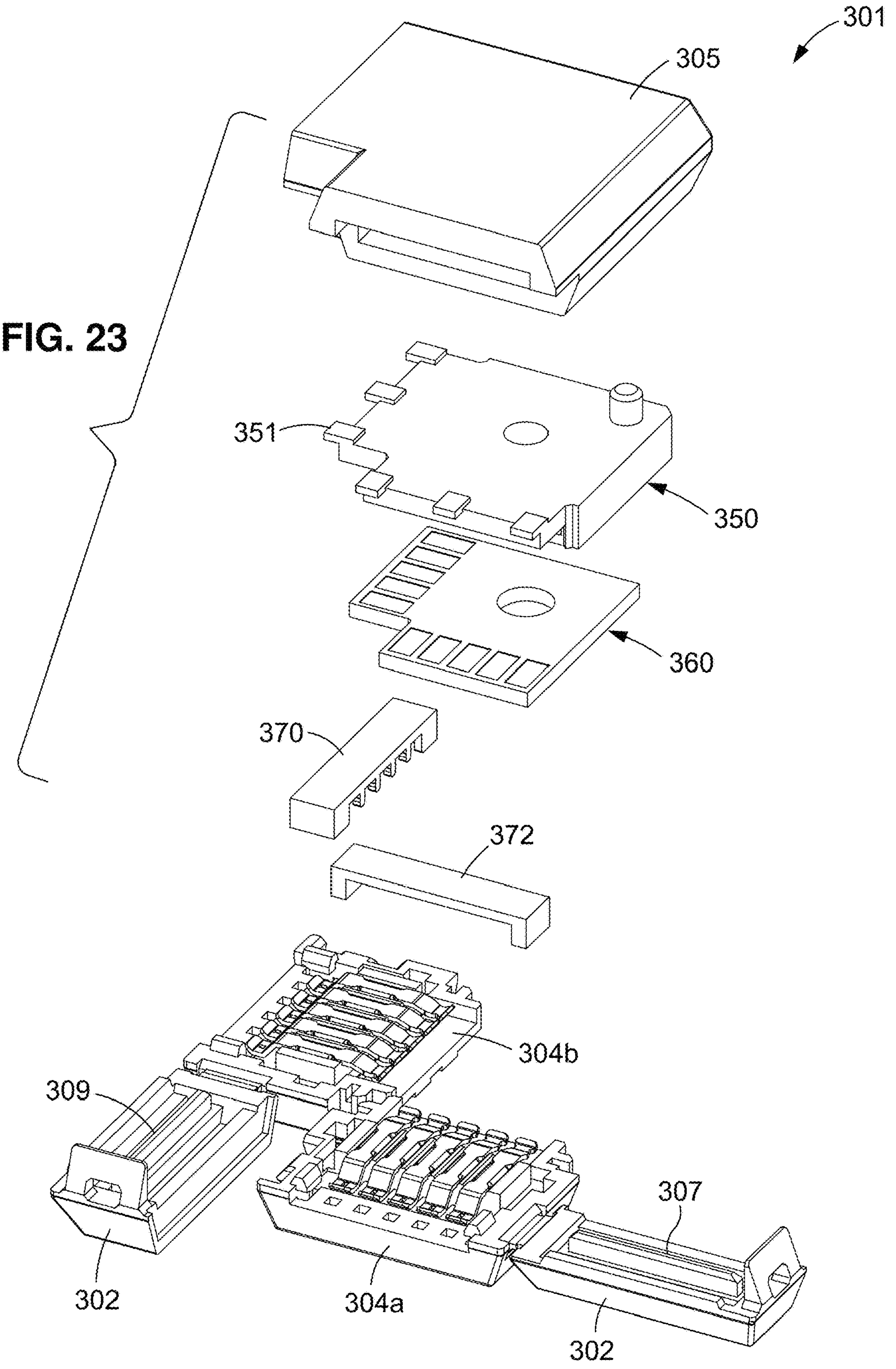
FIGS. 23 and 24 are top isometric and bottom isometric views, respectively, of the connector of FIGS. 21 and 22, in accordance with one non-limiting embodiment of the disclosed concept.
Figure 24:
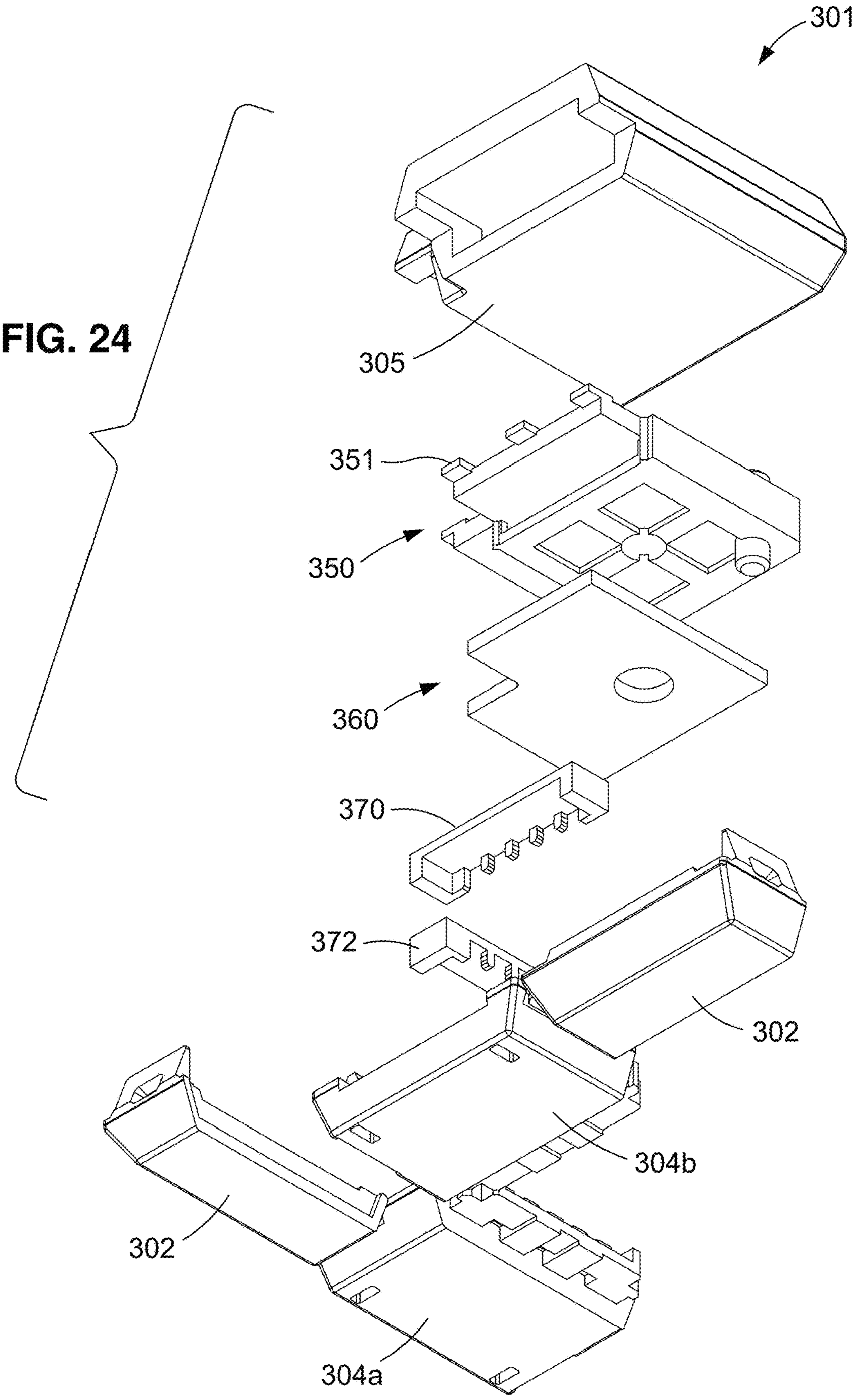

In one example, the clamp members 302 are configured to pivot between open and closed positions in order to maintain a connection between two sets of electrical contacts 330 and 340 (FIG. 19) of the connector 301, and electrical contacts of the LED light strips 390 and 392, in the same manner in which the clamp member 102 of the connector 101, discussed above, maintains a connection between the electrical contact 130 and the LED light strips 190 and 192. See, for example, FIGS. 21 and 22, which show the connector 301 with one of the clamp members 302 in an open position (FIG. 21) and with one of the clamp members 302 in a closed position (FIG. 22). As shown, the longitudinal rib 309 is configured to press into a top portion of the first portion 344 of the electrical contact 340, thereby pressing the electrical contact 340 into a tight-fitting engagement with an electrical contact of the LED light strip 390 (shown in phantom line drawing in FIG. 18). The electrical contacts 330 are similarly configured to be maintained in engagement with the other LED light strip 390 via the other clamp member 302.

In one embodiment, the two base members 304*a* and 304*b* are connected to one another, and in a manner in which the electrical connectors thereof are joined. In one embodiment, a connector body 360, which may be generally "L"-shaped, and has contacts on legs thereof, engages the electrical contacts 330 and 340 of the two base members 304*a* and 304*b*. This body 306 may comprise a conductive body or comprise a plurality of leads which effectively electrically corresponding ones of the electronical contacts 330 and 340 (e.g. connect mating "ground" contacts, power contacts, etc.).

Figure 20:
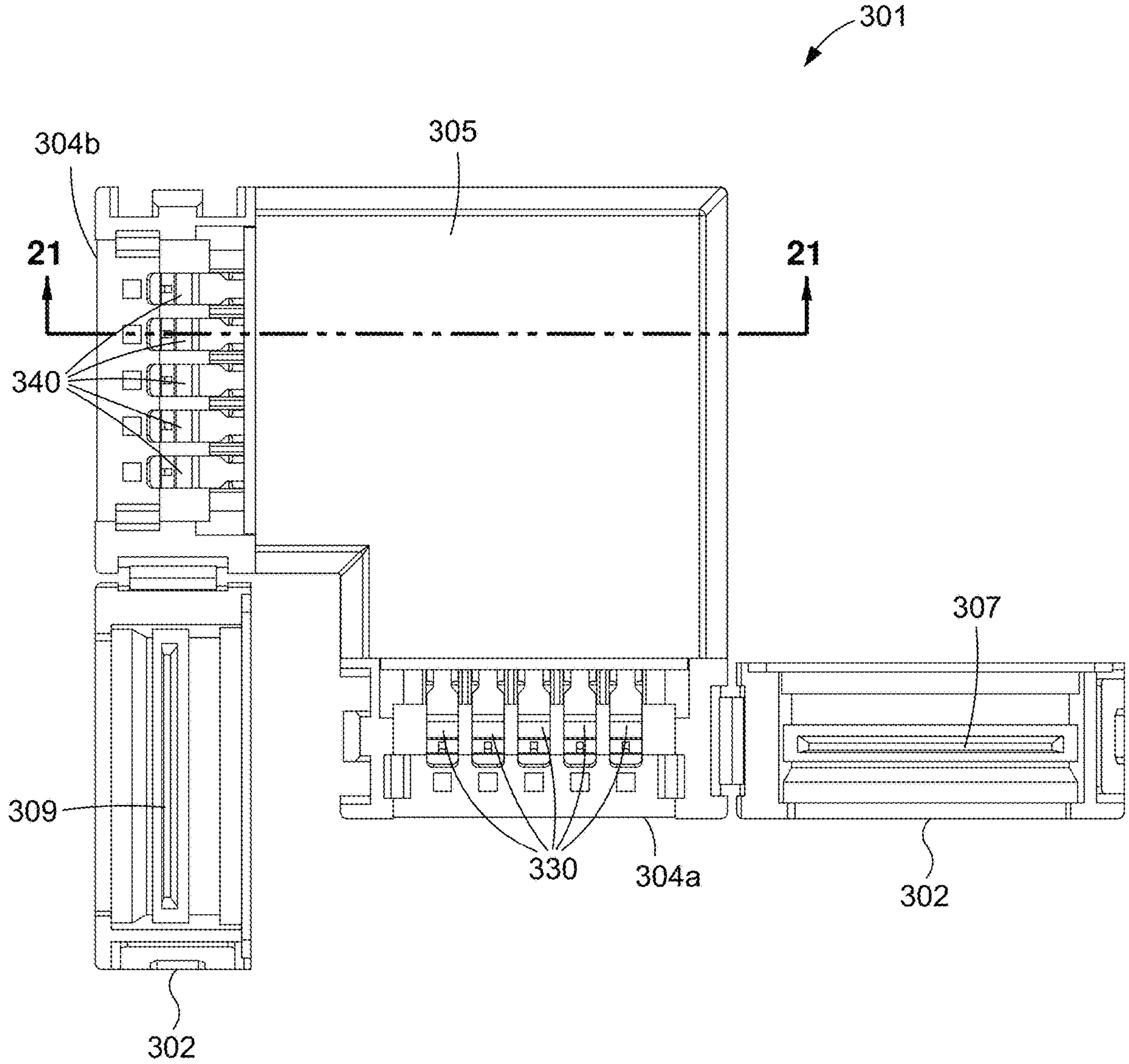
Figure 21:
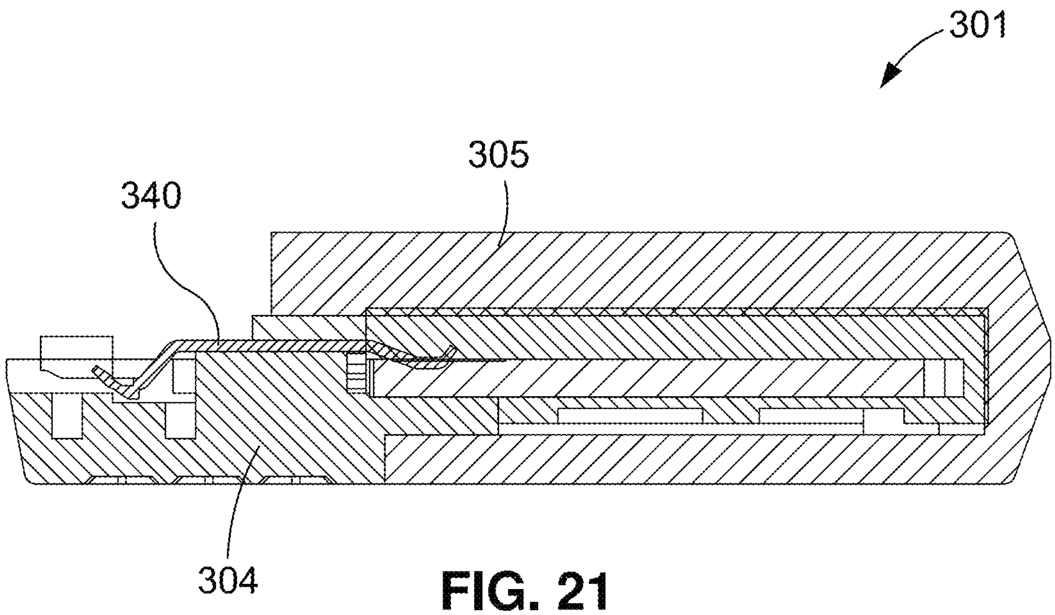
FIGS. 21 and 22 are section views of the connector of FIGS. 19 and 20, shown with a clamp member in open and closed positions, respectively, with respect to a base member.

The connector body 360 may be held in place via first and second locking bars 370,372 which are located over the ends of the electronical contacts 330 and 340 and press them downwardly against the connector body 360. As illustrated, a locking member 350 may be located over the connector body 360 and include outwardly extending tabs 351 on legs or extensions thereof which extend over the locking bars 370 and 372, thus maintaining them in place on the base members 304*a* and 304*b*. In one embodiment, a cover 305 then fits over the locking member 350. This cover 305 may be generally "L"-shaped, having first and second leg portions which connect to the base members 304*a* and 304*b*. In this configuration, the cover 305 preferably connector to the base members 304*a* and 304*b*, such as in a snap-fit engagement. This results in a connection of the base member 304*a* and 304*b* to one another in a perpendicular arrangement, and maintains the locking member 350 and connector body 360 in position. Further, as illustrated in FIG. 20, this causes the connector 301 to appear as a single element or body.

Figure 18:
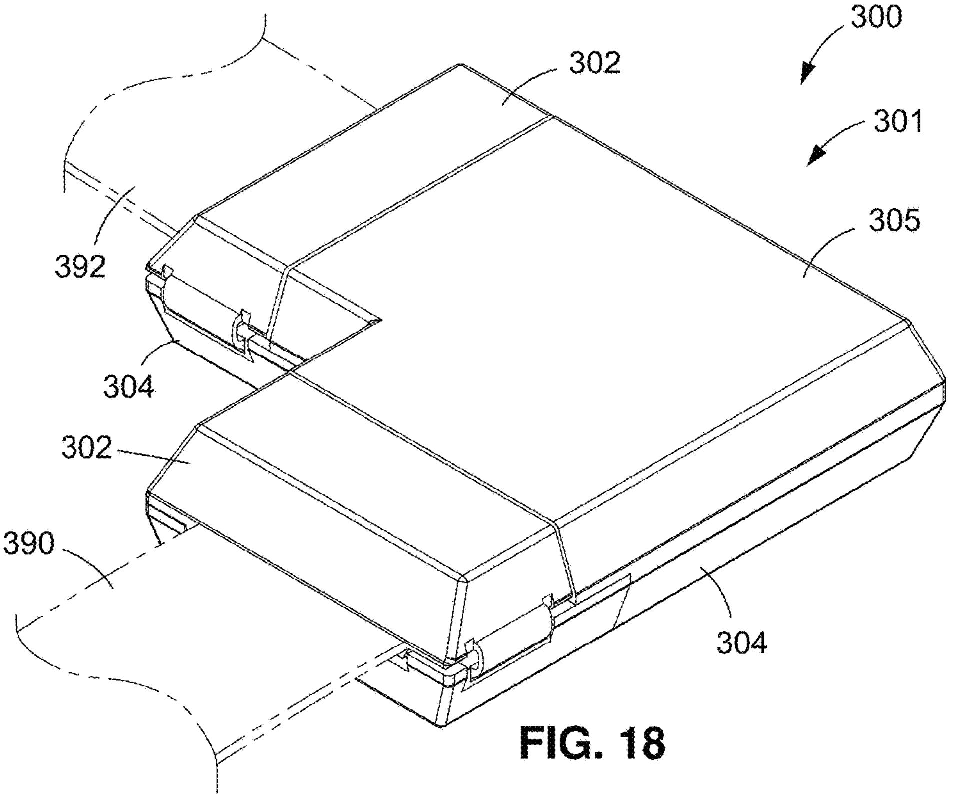
FIG. 18 is an isometric view of another LED light strip assembly and connector for the same, shown with two LED light strips in phantom line drawing, in accordance with one non-limiting embodiment of the disclosed concept.
Figure 19:
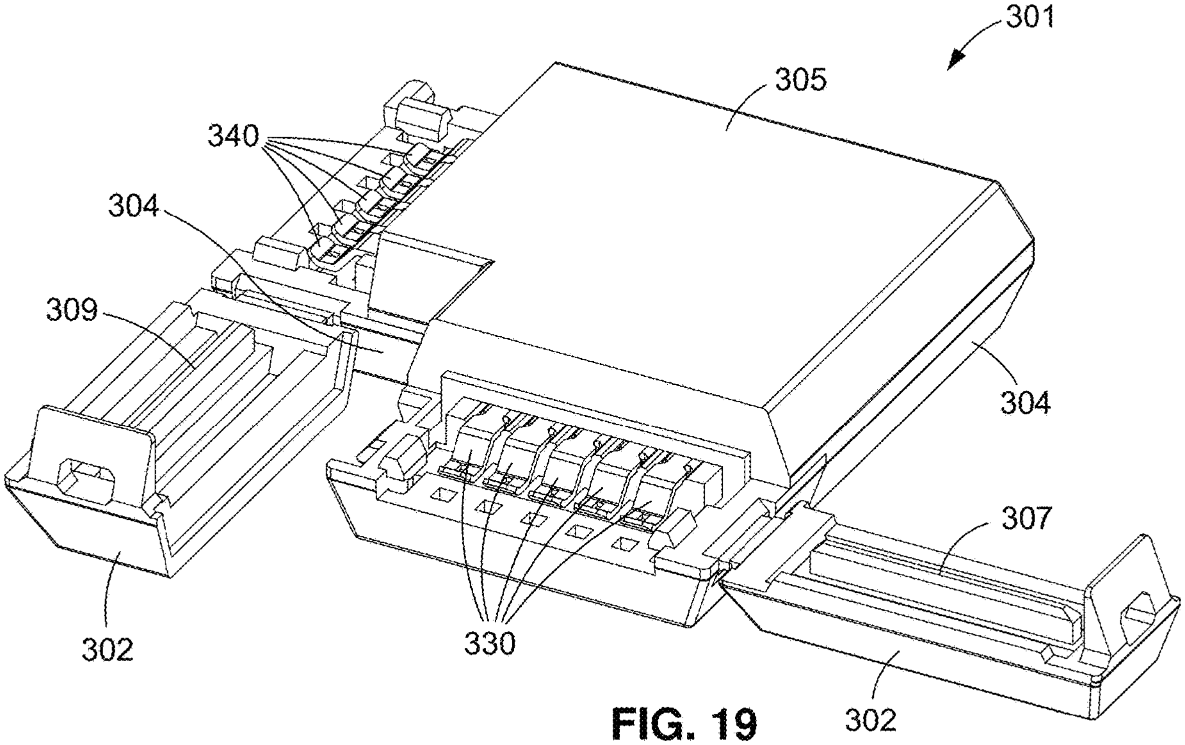
FIGS. 19 and 20 are isometric and top plan views of the connector of FIG. 18, and are shown with clamp members in open positions.

Appreciation of the cover 305 can also be provided with reference to FIG. 18. As shown, the cover may be described as having a main portion 305-1, a first arm 305-2 extending from the main portion 305-1, and a second arm 305-3 extending from the main portion 305-1. The first and second arms 305-2 and 305-3 are each configured to accept a corresponding one of said first and second LED light strips 390 and 392. Moreover, the first and second ends (see FIGS. 2 and 12 for reference numbers) of the base members 304*a* and 304*b*, and the first and second clamp members 302, are provided with the first and second arms 305-2 and 305-3, respectively. It can also be seen in FIG. 18 that the cover is preferably "L" shaped.

Figure 25:
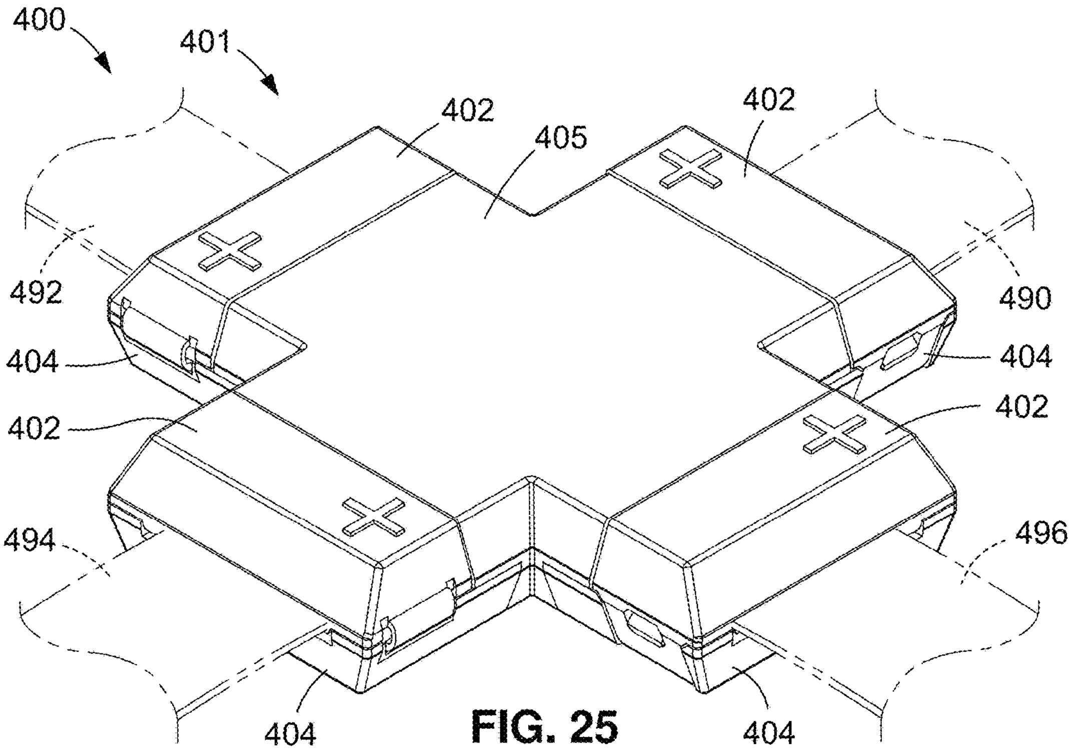
FIG. 25 is an isometric view of an LED light strip assembly including the connector of FIGS. 23 and 24, and is shown with four LED light strips in phantom line drawing.

FIG. 25 shows another LED light strip assembly 400, which includes another connector 401 and a number of LED light strips 490 and 492 and 494 and 496. As shown in FIGS. 25-30, the connector 401 for the LED light strips 490 and 492 and 494 and 496 is configured similar to the connectors 101 and 201 and 301, discussed above, and like numbers represent like features. More specifically, the connector 401 includes base members 404 configured similar to the base members 104 and 204 and 304*a* and 304*b*, e.g., including first and second sides, first and second ends, top, bottom, etc. However, for ease of illustration and economy of disclosure, the sides, ends, top and bottom of the base members 404 are not labeled. Moreover, it will be appreciated that the connector 401 is advantageously configured to connect four different LED light strips 490 and 492 and 494 and 496 together, where each LED light strip is oriented perpendicular to the LED light strips adjacent thereto.

Figure 26:
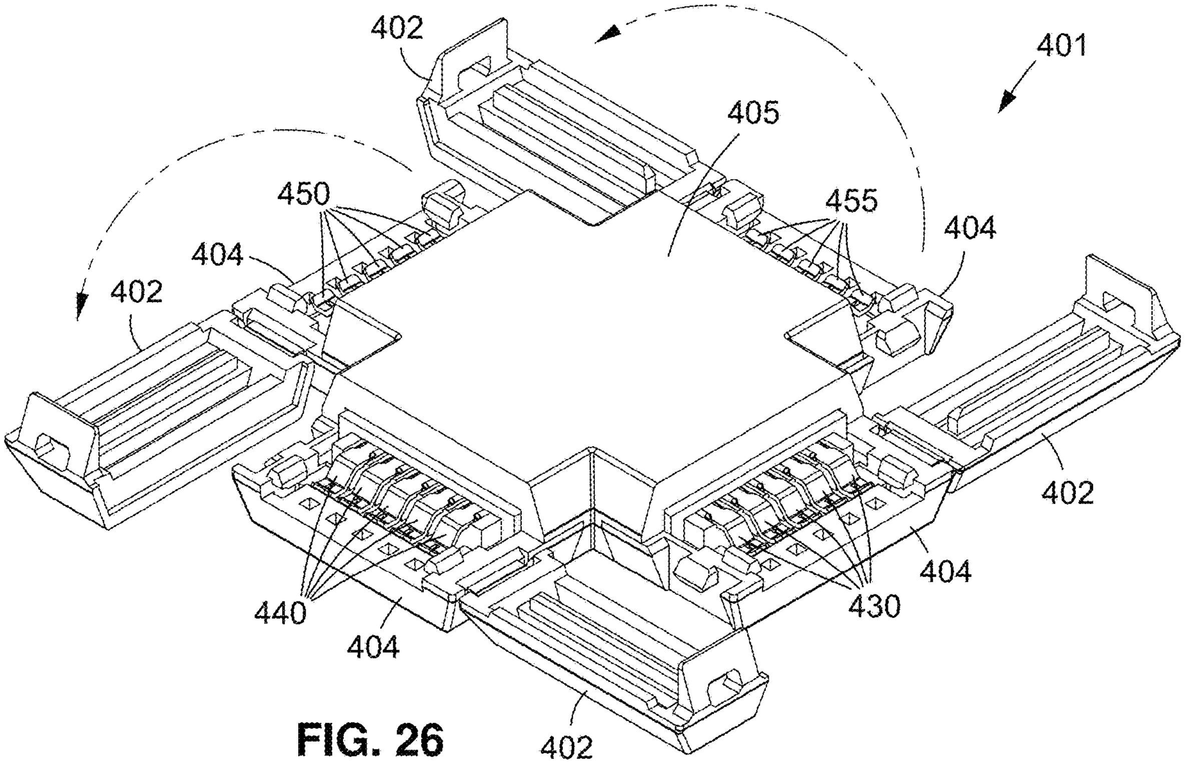
FIGS. 26-30 are front isometric, top plan, section, exploded front isometric, and exploded rear isometric views, respectively, of the connector of FIGS. 23 and 24.
Figure 27:
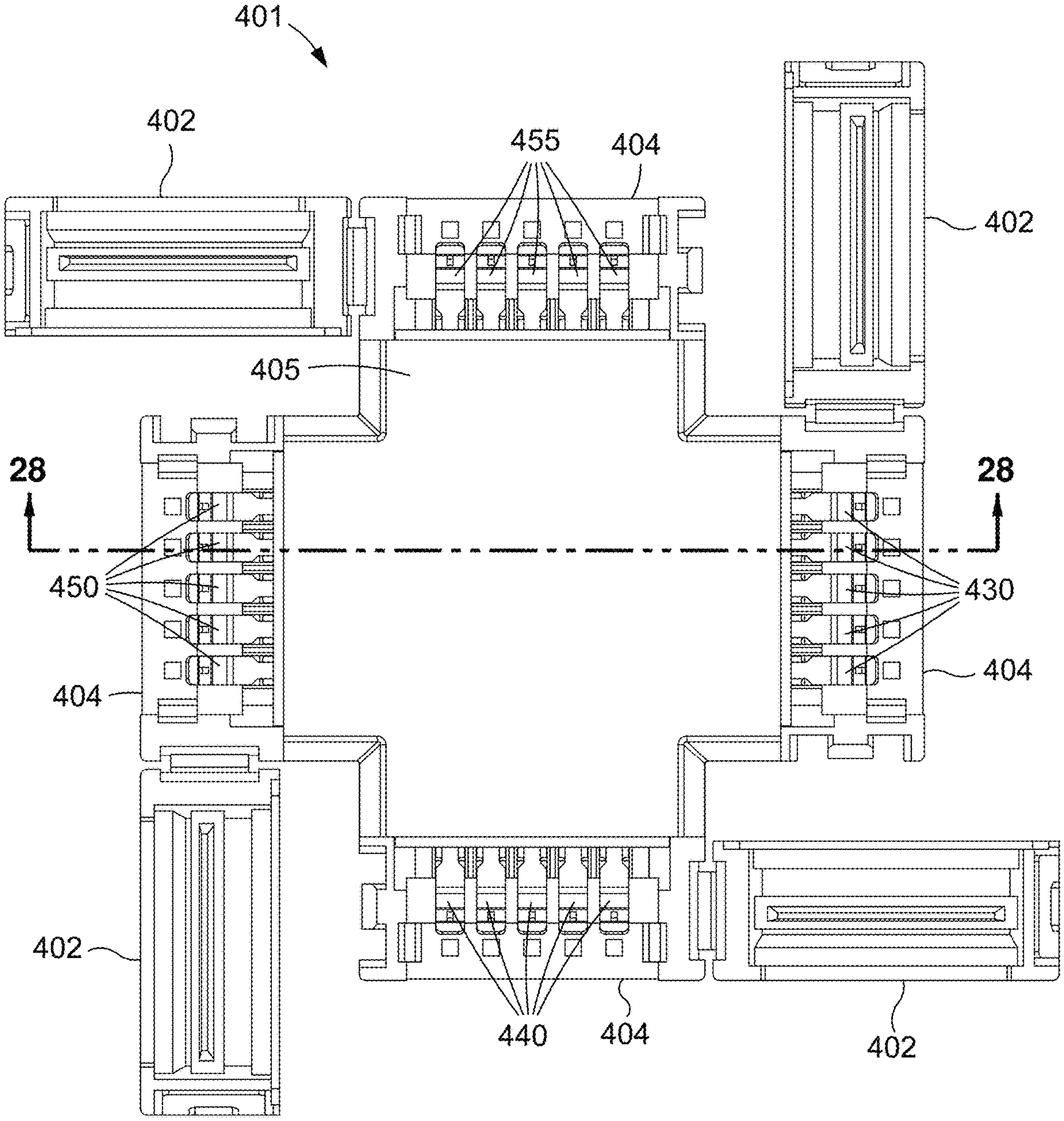
Figure 28:
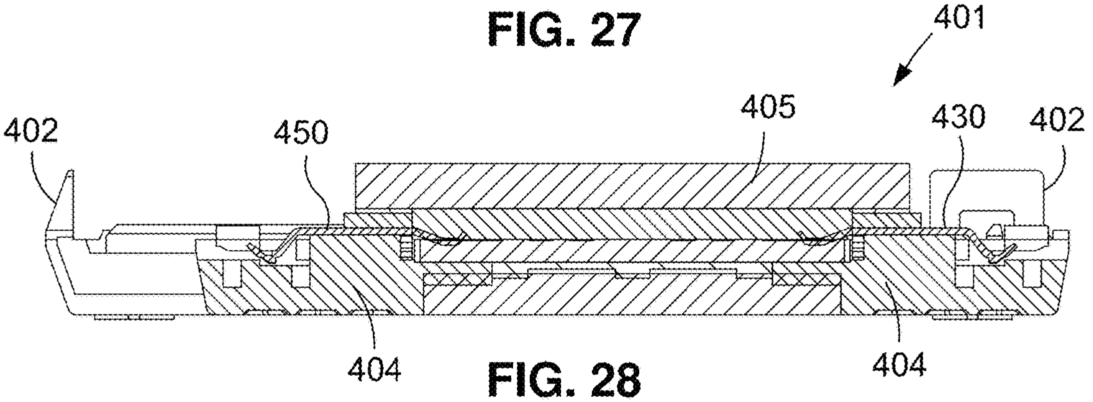

As shown in FIGS. 25 and 26, the connector 401 preferably includes four base members 404, four corresponding clamp members 402 (each preferably configured to pivot between open and closed positions with respect to a corresponding one of the base members 404), and four sets of a number (e.g., five) of electrical contacts 430 and 440 and 450 and 455 each mechanically coupled to a corresponding one of the four base members 404 and each configured to be pressed into engagement with a corresponding electrical contact of a corresponding one of the LED light strips 490 and 492 and 494 and 496 via a longitudinal rib (shown but not labeled) of a corresponding one of the four clamp members 402, in similar manner to that described above.

Figure 29:
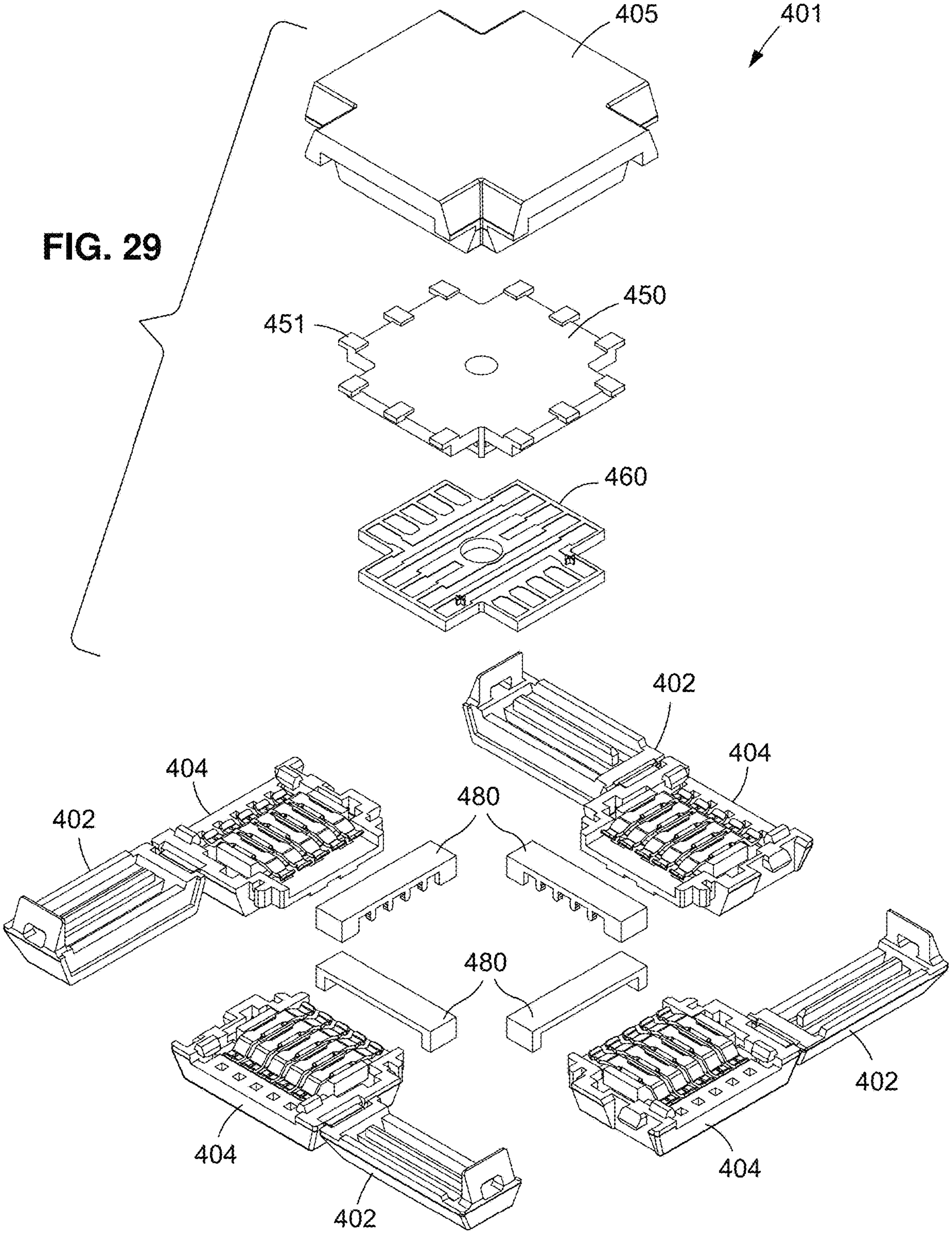
Figure 30:
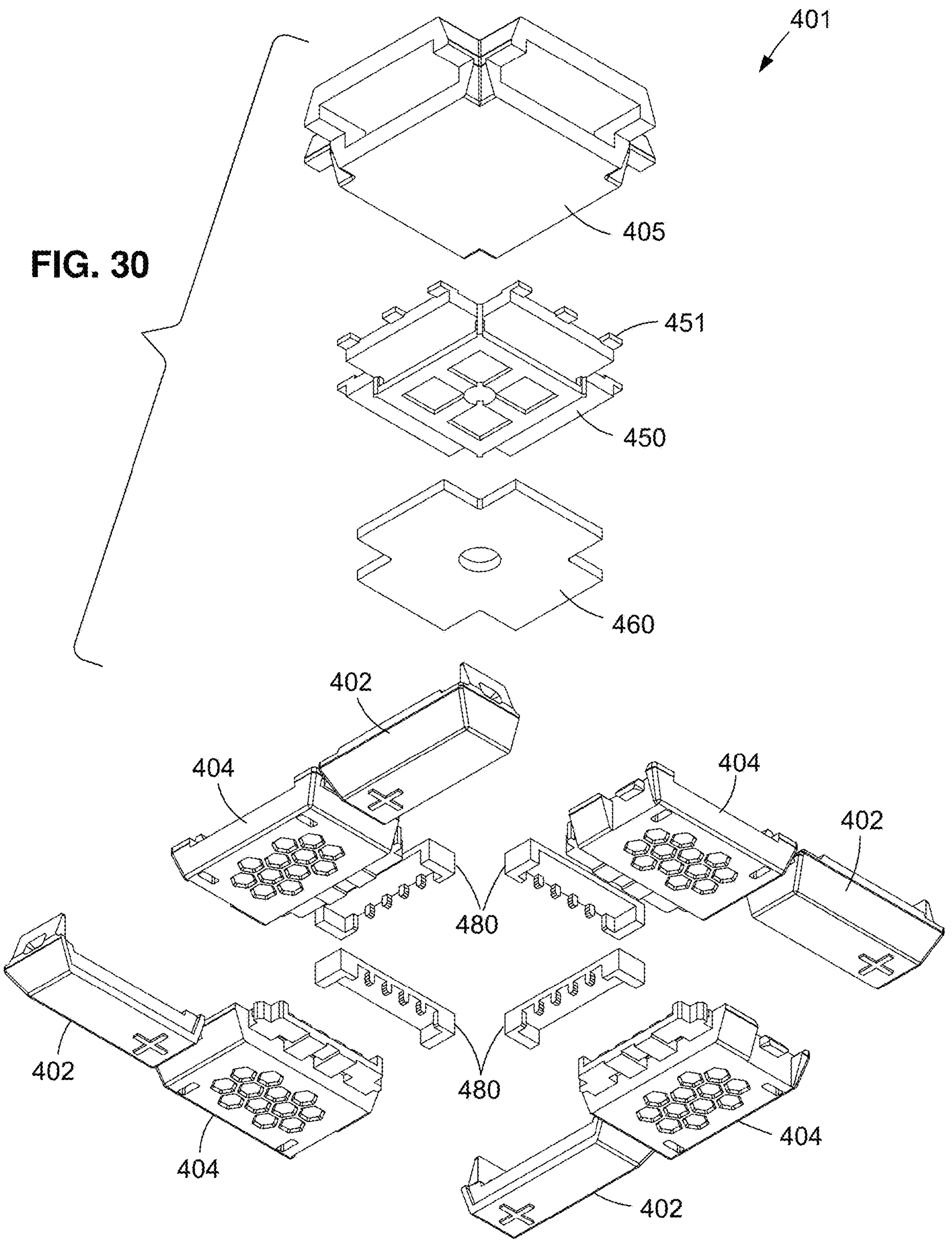

Once again, as illustrated in FIGS. 29 and 30, a connector body 460 is configured to join corresponding electrical contacts 430 and 440 and 450 and 455. A number (e.g., four) of locking bars 480 once again engage each base member 404 to press the electrical contacts into engagement with the connector body 460, and a locking member 450 having tabs 451 is configured to engage the locking bars 480. Lastly, a cover 405 is configured to connect to the four base members 404, joining them to one another in a "+" configuration (i.e., cross-shaped) and maintaining the positions of the locking member 450 and connector body 460. That is, first and second base members 404 may be oriented perpendicular to each other, and third and fourth base members 404 may be oriented perpendicular to each other. Once again, as assembled, the connector 401 appears to comprise a single body.

It will be appreciated that principles of the invention may be applied to light strip connectors having other configurations. For example, connectors might be configured to connect light strips or cables at other orientations, such as 30 degrees or 60 degrees to one another. A connector might permit connection of light strips or cables in a "T" arrangement. The connector of the invention might be used to connect light strips or cables having other numbers of leads, such as less than 5 (such as 2-4) or more than 5, in which case the connectors might include other numbers of electronical contacts.

In one embodiment, portions of the connectors might be colored or have surface features, such as to make the connector aesthetically pleasing to an observer thereof.

The invention has a number of advantages. In one embodiment, clamping or similar elements are movably connected to a body for pressing contacts of a connector and one or more light strips into engagement with one another, such as via a clamping force which is applied thereto. Relative to an embodiment such as that illustrated in FIGS. 1 and 2, the "side" mounting of the clamping elements allows them to be placed directly adjacent to one another, thereby reducing the length-wise dimension of the end-to-end connector (as opposed, for example, to a configuration in which the clamps are pivotally connected at a middle portion of the connector and each face opposing ends of the connector, wherein at the point of their joinder to the connector, the two clamps must be spaced apart in order to permit them to each pivot relative to the connector without interference). Also, in the illustrated configuration, the "side" closure configuration allows for more secure locking of the clamping element, as it is securely fixed vi a the pivot at one side, thereby only requiring a single locking element at the opposing end thereof (again, as opposed to a configuration where the clamping elements are hinged at a middle of the connector and must be locked to the connector at both sides (due to the fact that the LED strip passes into the front and rear of the connector, the clamps can't be connected there in such a configuration)).

Another advantage of the invention is the secure linking of LED light strips at different angles. For example, relative to FIG. 18, the connector has a main body, including an associated cover, which links the base members and associated clamping elements. This body and associated cover links the base members in a manner which retains them rigidly in the desired 90 degree orientation (without bending, twisting, etc.). This configuration also creates a visually appealing connector configuration, because the connector appears as a single unit and the electrical connection between the base members are hidden under the cover.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the methods described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A connector for an LED light strip assembly, the assembly comprising a first LED light strip and a second LED light strip, said connector comprising:

at least one base member, comprising:

- a first end and a second end disposed opposite said first end, at least one of said first end and said second end configured to accept said first LED light strip or said second LED light strip in order to electrically connect said first LED light strip to said second LED light strip,
- a first side and a second side disposed opposite the first side, each of the first and second sides extending from the first end to the second end,
- a top spanning from the first end to the second end, and from the first side to the second side, and
- a bottom disposed opposite the top, and spanning from the first end to the second end, and from the first side to the second side;

a first clamp member and a second clamp member each associated with said at least one base member; and a number of electrical contacts coupled to said at least one base member and each configured to be electrically connected to each of said first and second LED light strips, wherein each of said first and second clamp members are configured to pivot about the first side of any of said at least one base member between open and closed positions, with respect to said at least one base member, such that when said first and second clamp members are in the closed position, said first and second clamp members each face said top and press each of said electrical contacts into a tight-fitting engagement with a corresponding electrical contact of said first and second LED light strips, and wherein said number of electrical contacts of said connector is a plurality of electrical contacts each comprising a middle portion, a pair of contact portions each extending away from said middle portion, and a number of coupling portions extending from said middle portion and configured for coupling to said at least one base member, and wherein, when said first and second clamp members are in the closed position, said first and second clamp members maintain one of each of said pair of contact portions in said tight-fitting engagement with said corresponding electrical contact of said first and second LED light strips.

2. The connector according to claim 1, wherein said at least one base member comprises a first base member and a second base member, wherein said plurality of electrical contacts are a first plurality of electrical contacts, and wherein said connector further comprises a second plurality of electrical contacts coupled to said second base member, a cover coupling said first base member to said second base member, and a conductive connector body for electrically connecting the first plurality of electrical contacts to the second plurality of electrical contacts.

3. The connector according to claim 2, further comprising first and second locking bars positioned over and configured to press ends of the first plurality of electrical contacts and the second plurality of electrical contacts downwardly against said connector body, and a locking member disposed over said connector body for maintaining said first and second locking bars in place on said first base member and said second base member, and wherein said first base member and said second base member are oriented perpendicular with respect to each other.

4. The connector according to claim 2, wherein said cover has a main portion, a first arm extending from said main portion, and a second arm extending from said main portion, wherein said first and second arms are each configured to accept a corresponding one of said first and second LED light strips, wherein the first and second ends and the first and second clamp members are provided with the first and second arms, respectively, and wherein said cover is L-shaped.

5. The connector according to claim 1, wherein each of said first and second clamp members comprises a body and a rib extending outwardly from said body of said first and second clamp members, and wherein said rib is configured to engage at least one of said number of electrical contacts of said connector in the closed position.

6. The connector according to claim 1, wherein each of said pair of contact portions and said number of coupling portions extends downwardly from said middle portion, wherein said at least one base member comprises a plurality of ribs, and wherein said middle portion is coupled to said at least one base member via a snap-fit mechanism between a corresponding pair of the plurality of ribs of said at least one base member.

7. The connector according to claim 1, wherein said number of coupling portions is a pair of coupling portions disposed on opposing sides of said middle portion, and wherein said middle portion is disposed perpendicular to said pair of coupling portions.

8. The connector according to claim 1, wherein, when said first and second clamp members are in the closed position, said first and second clamp members are each coupled to said at least one base member via a tongue and groove mechanism.

9. The connector according to claim 1, wherein said at least one base member comprises a first base member, a second base member, a third base member, and a fourth base member, wherein said plurality of electrical contacts are a first plurality of electrical contacts, wherein said connector further comprises a second, third, and fourth plurality of electrical contacts, and a cover coupled to each of said first, second, third, and fourth base members, wherein said second, third, and fourth plurality of electrical contacts are each coupled to a corresponding one of said second, third, and fourth base members.

10. The connector according to claim 9, further comprising a connector body for electrically connecting the first, second, third, and fourth plurality of electrical contacts together, first, second, third, and fourth locking bars each engaging a corresponding one of the first, second, third, and fourth base members in order to press the first, second, third, and fourth plurality of electrical contacts into engagement with said connector body, and a locking member configured to engage said first, second, third, and fourth locking bars, and wherein said cover is cross-shaped such that said first and second base members are oriented perpendicular to each other, and said third and fourth base members are oriented perpendicular to each other.

11. A connector for an LED light strip assembly, the assembly comprising an LED light strip and a supply cable, said connector comprising:

a base member, comprising:

a first end and a second end disposed opposite said first end, said first end configured to accept said LED light strip in order to electrically connect said LED light strip to said supply cable, a first side and a second side disposed opposite the first side, each of the first and second sides extending from the first end to the second end, a top spanning from the first end to the second end, and from the first side to the second side, and a bottom disposed opposite the top, and spanning from the first end to the second end, and from the first side to the second side;

a clamp member associated with said base member; and a number of electrical contacts coupled to said base member and each configured to be electrically connected to each of said light strip and said supply cable, wherein said clamp member is configured to pivot about the first side of said base member between open and closed positions, with respect to said base member, such that when said clamp member is in the closed position, said clamp member faces said top and presses each of said electrical contacts into a tight-fitting engagement with a corresponding electrical contact of said LED light strip, and wherein said number of electrical contacts is a plurality of electrical contacts each comprising a middle portion, a pair of contact portions each extending away from said middle portion, and a number of coupling portions extending from said middle portion and configured for coupling to said base member, and wherein, when said clamp member is in the closed position, said clamp member maintains one of each of said pair of contact portions in said tight-fitting engagement with said LED light strip.

12. The connector according to claim 11, wherein another one of each of said pair of contact portions is a semi-circular-shaped trough portion configured to engage a lead of said supply cable in order to electrically connect said supply cable to said LED light strip.

13. The connector according to claim 12, wherein said connector further comprises a cover coupled to the base member, wherein said cover is coupled to said base member via a snap-fit mechanism, and wherein said cover defines a slot at an end thereof for receiving the supply cable therethrough.

14. An LED light strip assembly, comprising:

a first LED light strip and a second LED light strip each comprising:

a body portion;

a number of LEDs disposed on the body portion; and a number of electrical contacts electrically connected to the number of LEDs; and a connector, comprising:

at least one base member, comprising:

a first end and a second end disposed opposite said first end, at least one of said first end and said second end configured to accept said number of electrical contacts of said first LED light strip or said second LED light strip in order to electrically connect said first LED light strip to said second LED light strip, a first side and a second side disposed opposite the first side, each of the first and second sides extending from the first end to the second end, a top spanning from the first end to the second end, and from the first side to the second side, and a bottom disposed opposite the top, and spanning from the first end to the second end, and from the first side to the second side;

a first clamp member and a second clamp member each associated with said at least one base member; and a number of electrical contacts coupled to said at least one base member and each configured to be electrically connected to said number of electrical contacts of said first and second LED light strips, wherein each of said first and second clamp members are configured to pivot about the first side of any of said at least one base member between open and closed positions, with respect to said at least one base member, such that when said first and second clamp members are in the closed position, said first and second clamp members each face said top and press each of said electrical contacts of said connector into a tight-fitting engagement with said electrical contacts of said first and second LED light strips, and wherein said number of electrical contacts of said connector is a plurality of electrical contacts each comprising a middle portion, a pair of contact portions each extending away from said middle portion, and a number of coupling portions extending from said middle portion and configured for coupling to said at least one base member, and wherein, when said first and second clamp members are in the closed position, said clamp member maintains one of each of said pair of contact portions in said tight-fitting engagement with a corresponding one of said electrical contacts of said first and second LED light strips.

15. The LED light strip assembly according to claim 14, wherein each of said pair of contact portions and said number of coupling portions extends downwardly from said middle portion, wherein said at least one base member comprises a plurality of ribs, and wherein said middle portion is coupled to said at least one base member via a snap-fit mechanism between a corresponding pair of the plurality of ribs of said at least one base member.

16. The LED light strip assembly according to claim 15, wherein said middle portion is disposed perpendicular to said number of coupling portions.

17. The LED light strip assembly according to claim 16, wherein said first and second clamp members each comprise a body and a rib extending outwardly from said body of said first and second clamp members, and wherein said rib is configured to engage at least one of said number of electrical contacts of said connector in the closed position.

* * * * *